(12) United States Patent
Park et al.

(10) Patent No.: US 11,991,659 B2
(45) Date of Patent: May 21, 2024

(54) METHOD FOR FINE TA ADJUSTMENT, AND NODE USING SAME

(71) Applicant: LG ELECTRONICS INC., Seoul (KR)

(72) Inventors: Haewook Park, Seoul (KR); Byounghoon Kim, Seoul (KR); Sukhyon Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 113 days.

(21) Appl. No.: 17/765,718

(22) PCT Filed: Oct. 5, 2020

(86) PCT No.: PCT/KR2020/013488
§ 371 (c)(1),
(2) Date: Mar. 31, 2022

(87) PCT Pub. No.: WO2021/066614
PCT Pub. Date: Apr. 8, 2021

(65) Prior Publication Data
US 2022/0386261 A1    Dec. 1, 2022

(30) Foreign Application Priority Data
Oct. 2, 2019   (KR) .......................... 10-2019-0122043

(51) Int. Cl.
*H04W 56/00*    (2009.01)

(52) U.S. Cl.
CPC ..... *H04W 56/0045* (2013.01); *H04W 56/001* (2013.01)

(58) Field of Classification Search
None
See application file for complete search history.

(56) References Cited

U.S. PATENT DOCUMENTS

2012/0064931 A1*  3/2012  Hamada ............ H04W 56/0045
                                                          455/509
2018/0288215 A1   10/2018  Rahman
(Continued)

OTHER PUBLICATIONS

Huawei, "DL Transmission Timing Alignment for IAB", R1-1908037, 3GPP TSG RAN WG1 Meeting #98, Aug. 17, 2019, See Section 2.2.

(Continued)

*Primary Examiner* — Saad Khawar
(74) *Attorney, Agent, or Firm* — BRYAN CAVE LEIGHTON PAISNER LLP

(57) ABSTRACT

The present specification relates to a method by which a device performs data transmission or reception in a wireless communication system, comprising: performing an initial access operation with other devices; and transmitting first information (M−N) times and second information N times to the other devices, wherein M and N are respectively natural numbers, M is greater than N, and the first information and the second information are respectively the information related to timing adjustment, the first information has a value differing from that of the second information, and the data transmission or reception with the other devices is performed on the basis of a timing advance (TA) value, which is based on the average of all of the first information transmitted (M−N) times and the second information transmitted N times.

9 Claims, 26 Drawing Sheets

(56) References Cited

U.S. PATENT DOCUMENTS

2019/0059063 A1    2/2019  Zhang et al.
2019/0159156 A1    5/2019  Abedini et al.
2019/0394738 A1*  12/2019  Abedini ............ H04W 74/0833

OTHER PUBLICATIONS

Qualcomm Incorporated, "IAB Node Synchronization Framework", R1-1909251, 3GPP TSG RAN WG1 Meeting #98, Aug. 17, 2019, See pp. 1-4.

* cited by examiner

METHOD FOR FINE TA ADJUSTMENT, AND NODE USING SAME

CROSS-REFERENCE TO RELATED APPLICATIONS

This application is the National Stage filing under 35 U.S.C. § 371 of International Application No. PCT/KR2020/013488, filed on Oct. 5, 2020, which claims the benefit of Korean Patent Application No. 10-2019-0122043, filed on Oct. 2, 2019, the contents of which are all hereby incorporated by reference herein in their entirety.

BACKGROUND OF THE DISCLOSURE

Field of the Disclosure

The present specification relates to wireless communication.

Related Art

As a wider range of communication devices require larger communication capacities, the need for mobile broadband communication that is more enhanced than the existing Radio Access Technology (RAT) is rising. Additionally, massive Machine Type Communications (massive MCT), which connects multiple devices and objects so as to provide various services regardless of time and place, is also one of the most important issues that are to be considered in the next generation communication. Moreover, discussions are made on services/terminals (or user equipment (UE)) that are sensitive to reliability and latency. And, discussions are made on the adoption of a next generation radio access technology that is based on the enhanced mobile broadband communication, massive MTC, Ultra-Reliable and Low Latency Communication (URLLC), and so on. And, for convenience, the corresponding technology will be referred to as a new radio access technology (new RAT or NR).

On the other hand, integrated access and backhaul link may be provided. Hereinafter, in this specification, features for Integrated Access Backhaul (IAB) will be provided.

SUMMARY OF THE DISCLOSURE

Technical Solutions

In an aspect, a method is provided. The method for performing a transmission or a reception of a data in a wireless communication system comprises performing an initial access operation with an another apparatus, transmitting, to the another apparatus, first information (M−N) times and second information N times, wherein each of the M and the N is a nature number, wherein the M is greater than the N, wherein each of the first information and the second information is related to adjustment of timing, wherein the first information has a different value from the second information, and performing the transmission or the reception of the data with the another apparatus based on a timing advance (TA) value based on an average of all of the first information transmitted the (M−N) times and the second information transmitted N times.

Effects of the Disclosure

According to the present specification, since a finer TA control method can be provided, more stable wireless communication can be provided.

The effects that can be obtained through a specific example of the present specification are not limited to the effects listed above. For example, there may be various technical effects that a person having ordinary skill in the related art can understand or derive from the present specification. Accordingly, specific effects of the present specification are not limited to those explicitly described in the present specification, and may include various effects that can be understood or derived from the technical features of the present specification.

DESCRIPTION OF EXEMPLARY EMBODIMENTS

In the present specification, "A or B" may mean "only A", "only B" or "both A and B". In other words, in the present specification, "A or B" may be interpreted as "A and/or B". For example, in this specification, "A, B or C" refers to "only A", "only B", "only C", or "any combination of A, B and C".

A forward slash (/) or comma used herein may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" can be interpreted the same as "at least one of A and B".

In addition, in the present specification, "at least one of A, B and C" means "only A", "only B", "only C", or "any combination of A, B and C". In addition, "at least one of A, B or C" or "at least one of A, B and/or C" can mean "at least one of A, B and C".

In addition, parentheses used in the present specification may mean "for example". Specifically, when described as "control information (PDCCH)", "PDCCH" may be proposed as an example of "control information". In other words, "control information" of the present specification is not limited to "PDCCH", and "PDDCH" may be suggested as an example of "control information". In addition, even when described as "control information (i.e., PDCCH)", "PDCCH" may be proposed as an example of "control information".

In the present specification, technical features that are individually described in one drawing may be implemented individually or at the same time.

Figure 1:
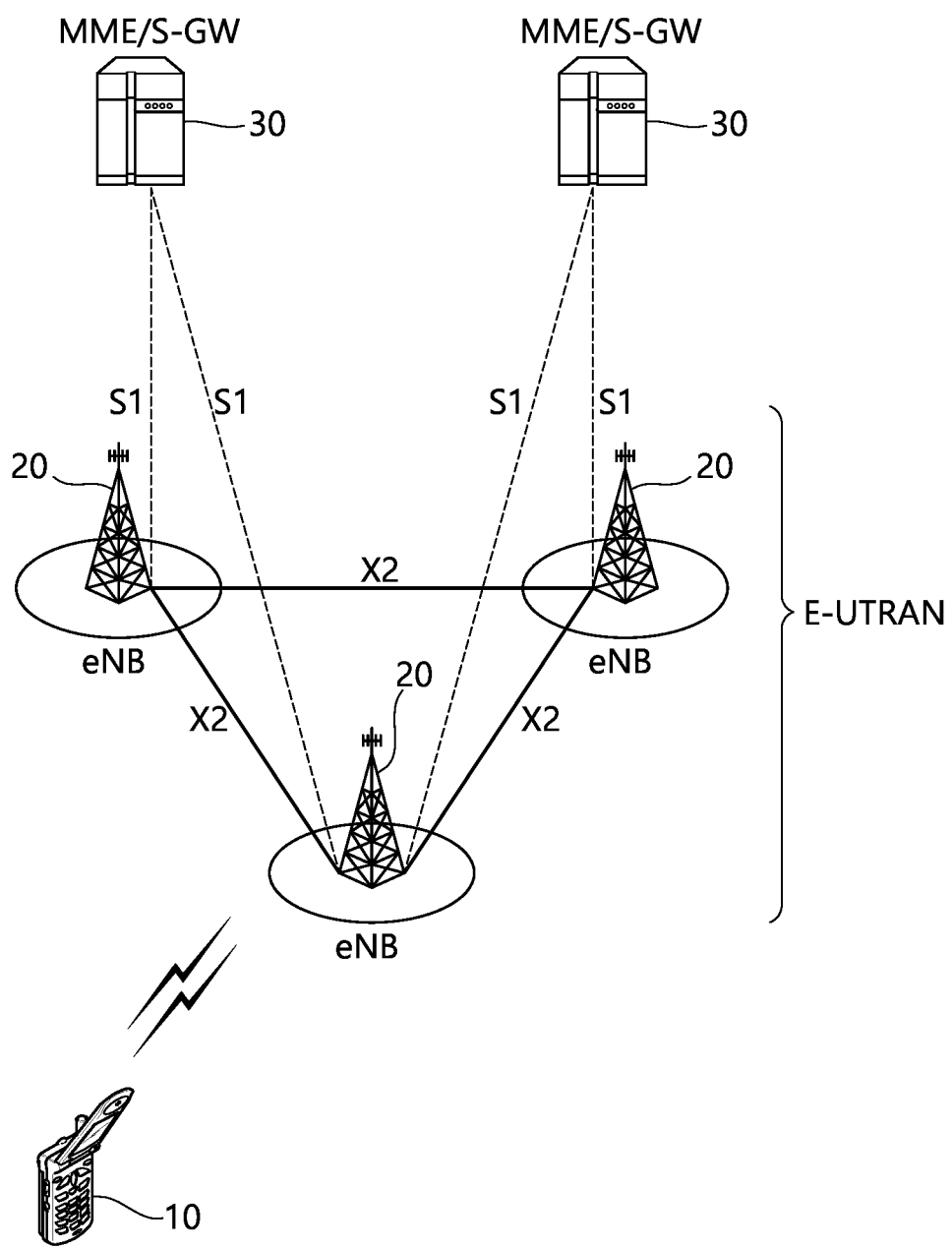
FIG. 1 illustrates a wireless communication system.

FIG. 1 illustrates a wireless communication system. The wireless communication system may also be referred to as an evolved-UMTS terrestrial radio access network (E-UTRAN), or long term evolution (LTE)/LTE-A system.

The E-UTRAN includes at least one base station (BS) (20) which provides a control plane and a user plane to a user equipment (UE) (10). The UE (10) may be fixed or mobile, and may be referred to as another terminology, such as a mobile station (MS), a user terminal (UT), a subscriber station (SS), a mobile terminal (MT), a wireless device, and so on. The BS (20) is generally a fixed station that communicates with the UE (10) and may be referred to as another terminology, such as an evolved node-B (eNB), a base transceiver system (BTS), an access point, and so on.

The BSs (20) are interconnected by means of an X2 interface. The BSs (20) are also connected by means of an S1 interface to an evolved packet core (EPC) (30), more specifically, to a mobility management entity (MME) through S1-MME and to a serving gateway (S-GW) through S1-U.

The EPC (30) includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
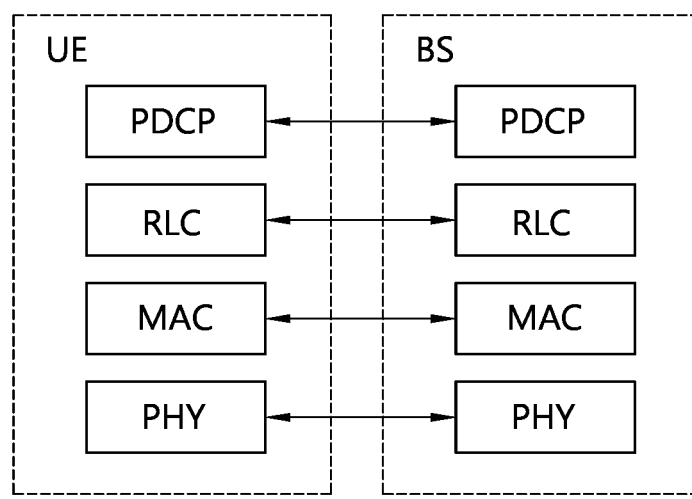
FIG. 2 is a diagram showing a wireless protocol architecture for a user plane.
Figure 3:
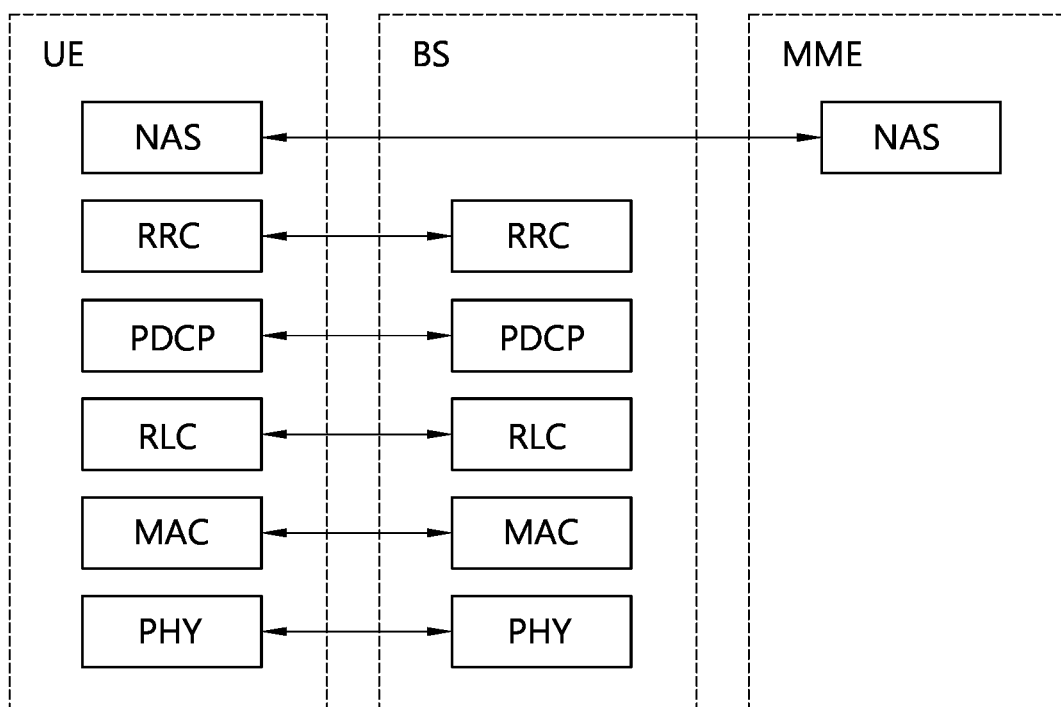
FIG. 3 is a diagram showing a wireless protocol architecture for a control plane. The user plane is a protocol stack for user data transmission.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel A Transmission Time Interval (TTI) is a unit time for subframe transmission.

Hereinafter, a new radio access technology (new RAT, NR) will be described.

As a wider range of communication devices require larger communication capacities, the need for mobile broadband communication that is more enhanced than the existing Radio Access Technology (RAT) is rising. Additionally, massive Machine Type Communications (massive MCT), which connects multiple devices and objects so as to provide various services regardless of time and place, is also one of the most important issues that are to be considered in the next generation communication. Moreover, discussions are made on services/terminals (or user equipment (UE)) that are sensitive to reliability and latency. And, discussions are made on the adoption of a next generation radio access technology that is based on the enhanced mobile broadband communication, massive MTC, Ultra-Reliable and Low Latency Communication (URLLC), and so on. And, for convenience, the corresponding technology will be referred to as a new RAT or NR.

Figure 4:
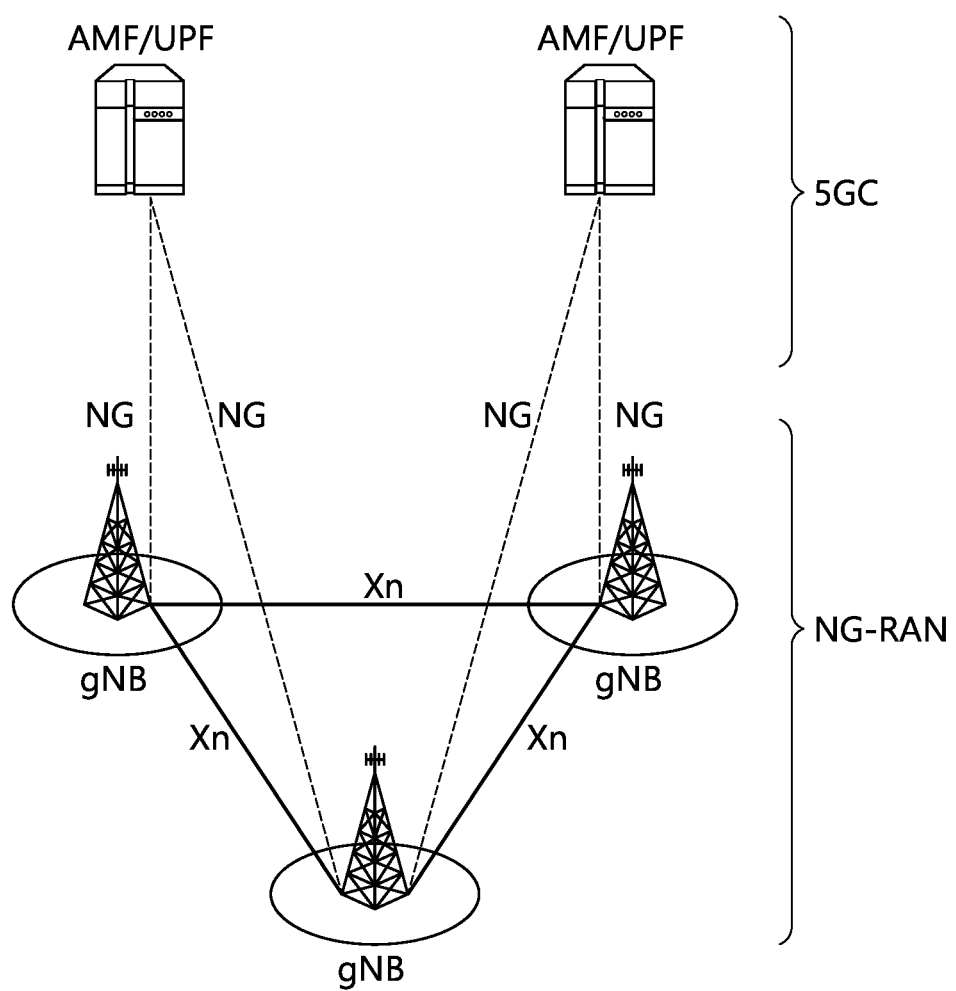
FIG. 4 illustrates a system structure of a new generation radio access network (NG-RAN) to which NR is applied.

FIG. 4 illustrates a system structure of a new generation radio access network (NG-RAN) to which NR is applied.

Referring to FIG. 4, the NG-RAN may include a gNB and/or an eNB providing a user plane and a control plane protocol termination to a terminal. FIG. 4 illustrates a case of including only the gNB. The gNB and eNB are connected to each other by an Xn interface. The gNB and eNB are connected to a 5G Core Network (5GC) through an NG interface. More specifically, the gNB and eNB are connected to the access and mobility management function (AMF) through an NG-C interface and connected to a user plane function (UPF) through an NG-U interface.

Figure 5:
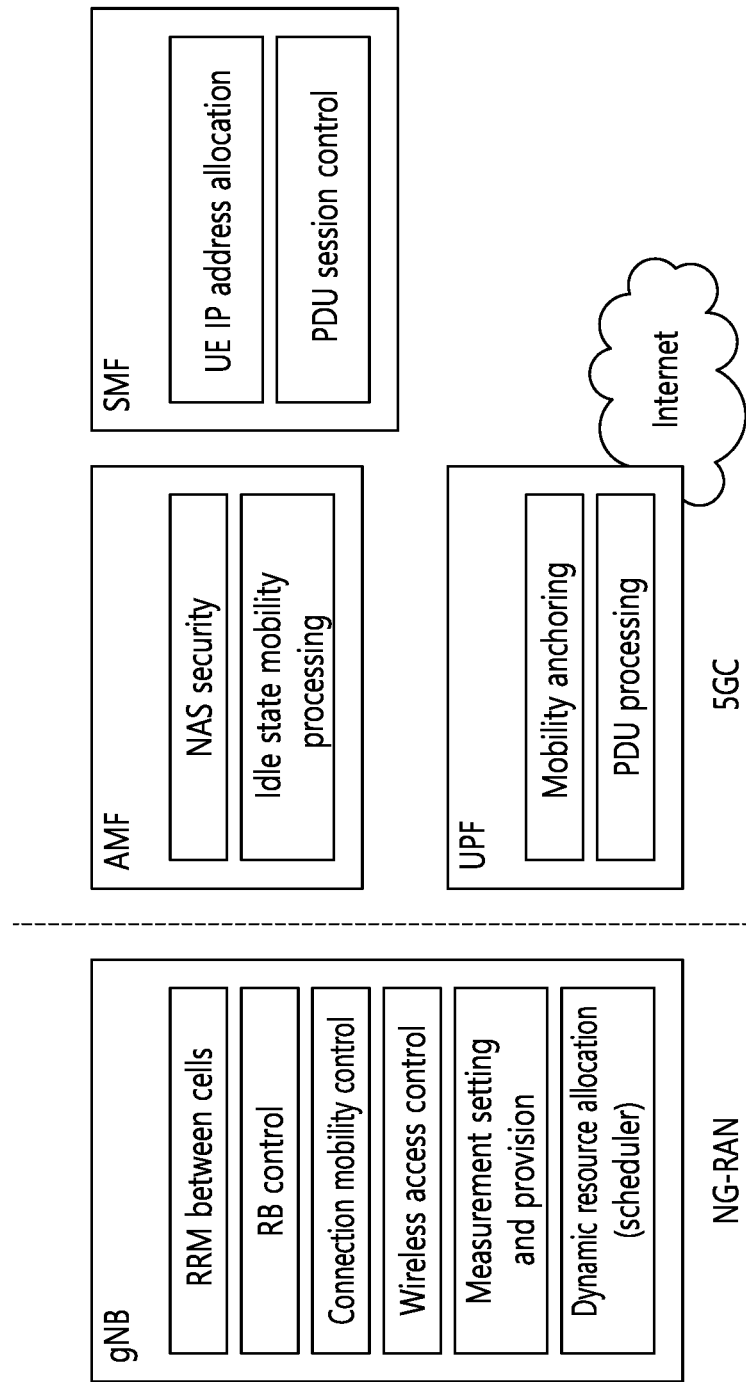
FIG. 5 illustrates functional partitioning between NG-RAN and SGC.

FIG. 5 illustrates functional partitioning between NG-RAN and 5GC.

Referring to FIG. 5, the gNB may provide inter-cell radio resource management (RRM), radio bearer (RB) control, connection mobility control, radio access control, measurement configuration & provision, dynamic resource allocation, and the like. An AMF may provide functions such as NAS security, idle state mobility handling, and the like. A UPF may provide functions such as mobility anchoring, PDU handling, and the like. A session management function (SMF) may provide functions such as UE IP address allocation, PDU session control, and the like.

Figure 6:
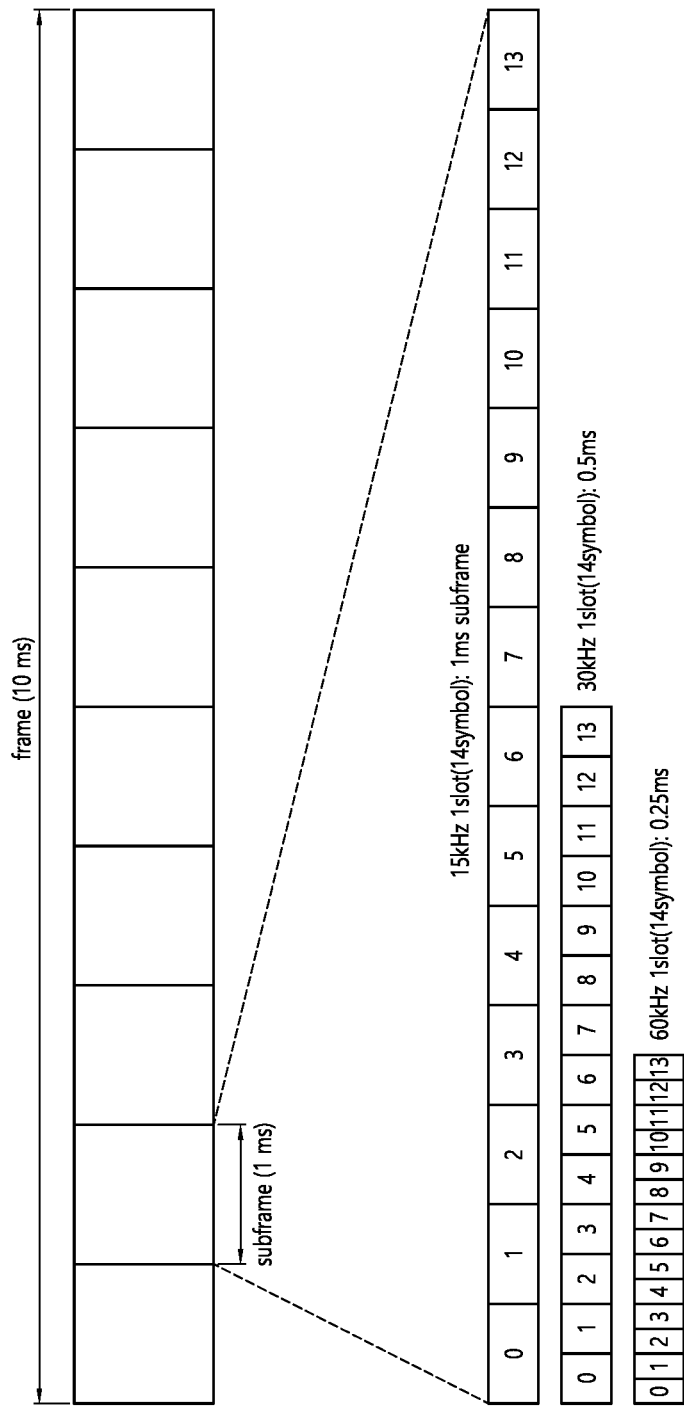
FIG. 6 illustrates a frame structure applicable in NR.

FIG. 6 illustrates a frame structure applicable in NR.

Referring to FIG. 6, a frame may consist of 10 milliseconds (ms) and may include 10 subframes of 1 ms.

A subframe may include one or a plurality of slots according to subcarrier spacing.

Table 1 below shows subcarrier spacing configuration $\mu$.

TABLE 1

| $\mu$ | $\Delta f = 2^\mu \cdot 15$ [kHz] | CP(Cyclic Prefix) |
|---|---|---|
| 0 | 15 | Normal |
| 1 | 30 | Normal |
| 2 | 60 | Normal, Extended |
| 3 | 120 | Normal |
| 4 | 240 | Normal |

Table 2 below shows the number of slots in a frame ($N^{frame,\mu}_{slot}$), the number of slots in a subframe ($N^{subframe,\mu}_{slot}$), and the number of symbols in a slot ($N^{slot}_{symb}$) according to the subcarrier spacing configuration $\mu$.

TABLE 2

| $\mu$ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

FIG. 6 shows $\mu=0$, 1, and 2. A physical downlink control channel (PDCCH) may include one or more control channel elements (CCEs) as shown in Table 3 below.

TABLE 3

| Aggregation level | Number of CCEs |
|---|---|
| 1 | 1 |
| 2 | 2 |
| 4 | 4 |
| 8 | 8 |
| 16 | 16 |

In other words, the PDCCH may be transmitted through a resource including 1, 2, 4, 8 or 16 CCEs. Here, the CCE includes six resource element groups (REGs), and one REG includes one resource block in the frequency domain and one orthogonal frequency division multiplexing (OFDM) symbol in the time domain. The following technologies/characteristics may be applied to NR. <Self-contained subframe structure>

Figure 7:
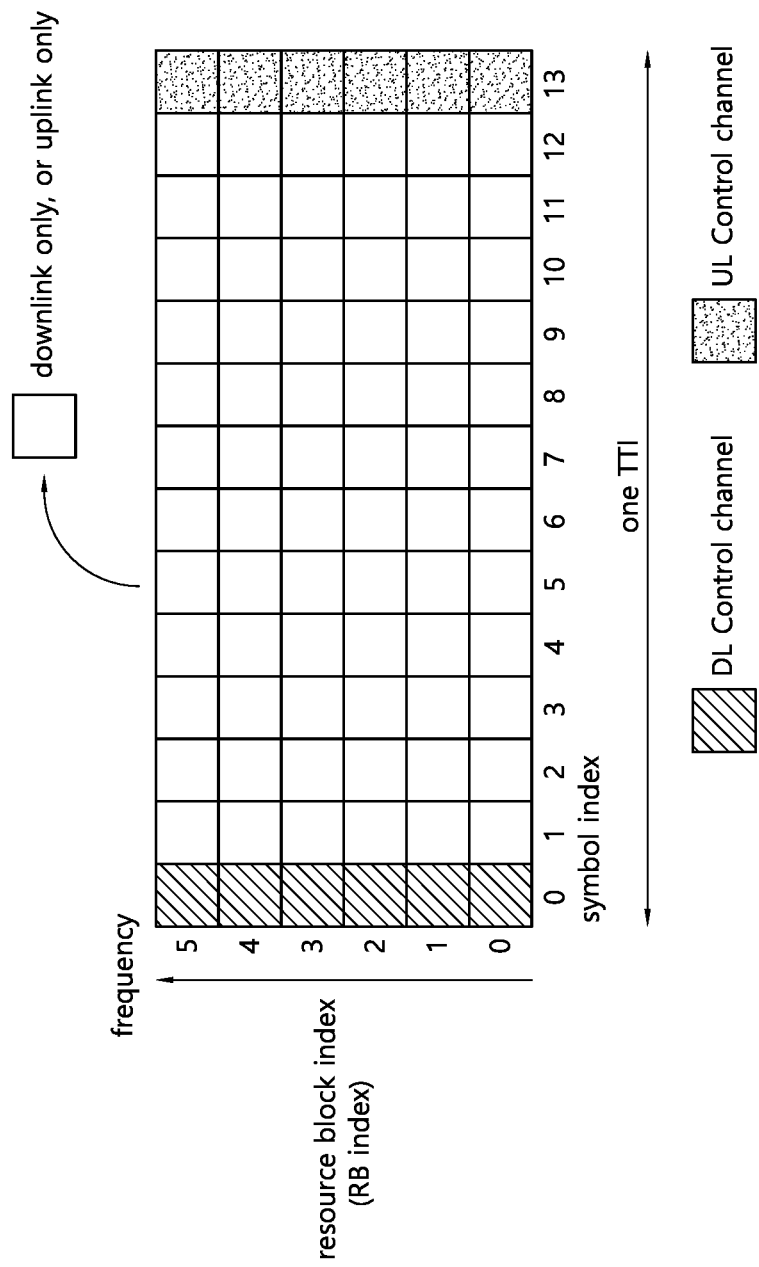
FIG. 7 illustrates an example of a frame structure for the new radio access technology (new RAT).

FIG. 7 illustrates an example of a frame structure for the new radio access technology (new RAT).

In NR, as a purpose for minimizing latency, as shown in FIG. 7, a structure having a control channel and a data channel being processed with Time Division Multiplexing (TDM), within one TTI, may be considered as one type of frame structure.

In FIG. 7, an area marked with slanted lines represents a downlink control area, and an area marked in black represents an uplink control area. An area marked in black may be used for downlink (DL) data transmission or may be used for uplink (UL) data transmission. The characteristic of such structure is that, since downlink (DL) transmission and uplink (UL) transmission are carried out sequentially, DL data is sent out (or transmitted) from a subframe, and UL Acknowledgement/Not-acknowledgement (ACK/NACK) may also be received in the subframe. As a result, time needed until data retransmission, when a data transmission error occurs, may be reduced, and, accordingly, latency in the final data transfer (or delivery) may be minimized In the above-described data and control TDMed subframe structure, a time gap is needed for a transition process (or shifting process) from a transmission mode to a reception mode of the base station and UE, or a transition process (or shifting process) from a reception mode to a transmission mode of the base station and UE. For this, in a self-contained subframe structure, some of the OFDM symbols of a time point where a transition from DL to UL occurs may be configured as a guard period (GP).

Figure 8:
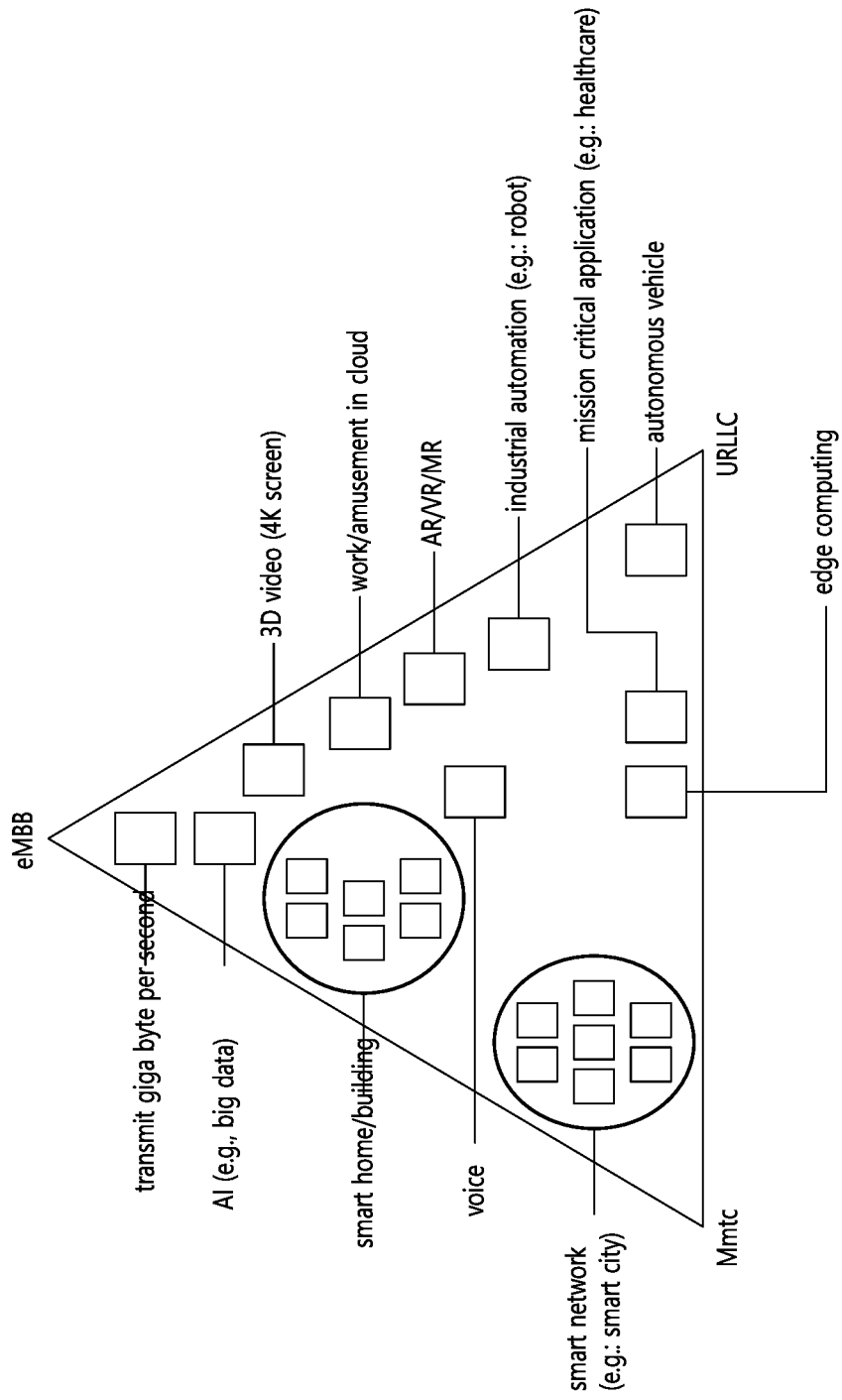
FIG. 8 shows examples of 5G usage scenarios to which the technical features of the present specification can be applied.

FIG. 8 shows examples of 5G usage scenarios to which the technical features of the present specification can be applied. The 5G usage scenarios shown in FIG. 8 are only exemplary, and the technical features of the present specification can be applied to other 5G usage scenarios which are not shown in FIG. 8.

Referring to FIG. 8, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km$^2$. mMTC allows seamless integration of embedded sensors in all areas and is one of the most widely used 5G applications. Potentially by 2020, IoT devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drone control and coordination.

Next, a plurality of use cases included in the triangle of FIG. 8 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g., devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time HD video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location-based information systems. Use cases of logistics and freight tracking typically require low data rates, but require a large range and reliable location information.

Figure 9:
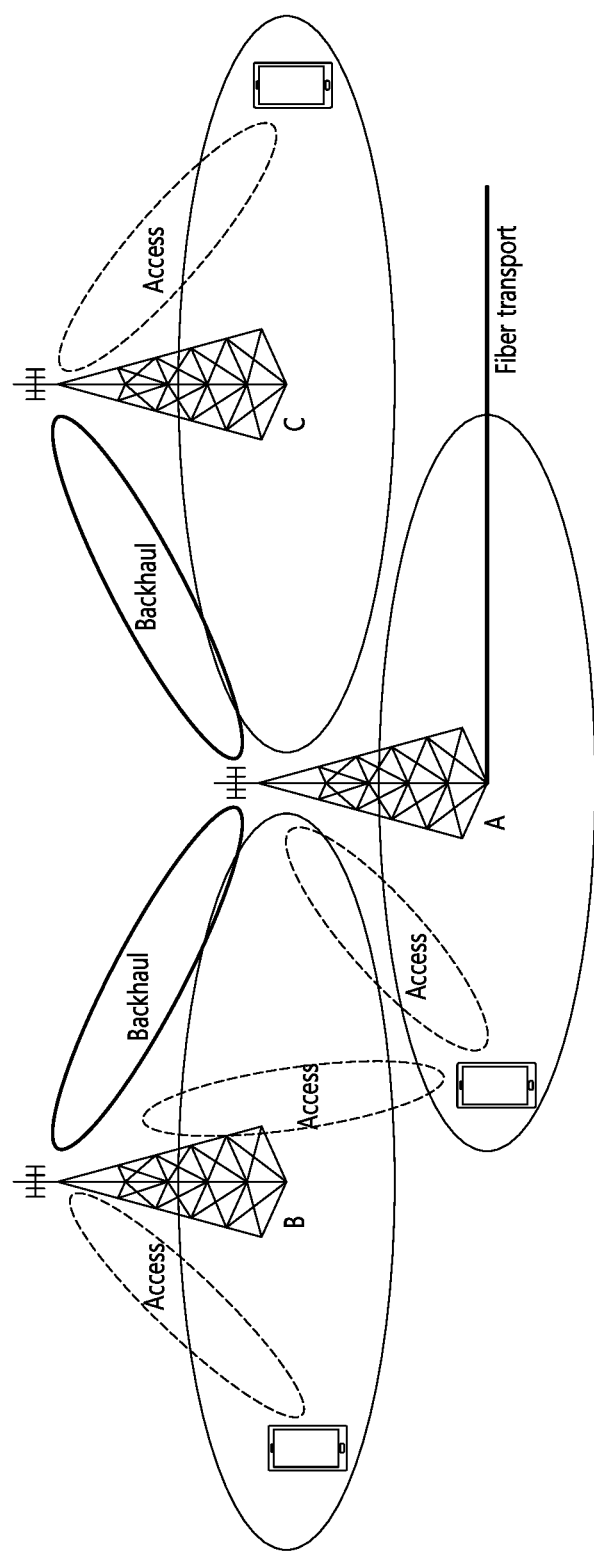
FIG. 9 schematically illustrates an example of integrated access and backhaul links.

FIG. 9 schematically illustrates an example of integrated access and backhaul links.

An example of a network having such integrated access and backhaul links is shown in FIG. 9. Here, a relay node (rTRP) can multiplex access and backhaul links in time, frequency or space (e.g., beam based operation).

Operations of different links may be at the same frequency or different frequencies (which may also be referred to as "in-band" and "out-band" relays). Although efficient support of the out-band relay is important in some NR deployment scenarios, it is very important to understand in-band operation requirements that mean a close interaction with an access link operating at the same frequency in order to accept duplex constraint and prevent/mitigate interference.

In addition, operation of an NR system in mmWave spectrum can present some unique challenges including experiencing serious short-term blocking that may not be easily mitigated by a current RRC based handover mechanism due to a larger time scale necessary to complete a procedure than short-term blocking.

To overcome short-term blocking in the mmWave system, a fast RAN based mechanism (which does not necessarily require intervention of a core network) for switching between rTRPs.

Necessity for mitigating short-term blocking for NR operation in the mmWave spectrum along with requirement for easier deployment of a self-backhauled NR cell may cause necessity of development of an integrated framework that enables rapid switching of access and backhaul links.

In addition, over-the-air (OTA) coordination between rTRPs can be regarded as mitigation of interference and support of end-to-end route selection and optimization.

The following requirements and aspects may need to be solved by integrated access and backhaul (IAB) for NR.

Efficient and flexible operation for in-band and out-band relays in indoor and outdoor scenarios Multiple hops and redundant connection End-to-end route selection and optimization Support of backhaul link with high spectrum efficiency Legacy NR UE support Legacy new RAT was designed to support half-duplex devices. Further, half-duplex of an IAB scenario deserves to be supported and to become an object. In addition, a full-duplex IAB device can be researched.

In the IAB scenario, a donor gNB (DgNB) needs to schedule all links between related relay nodes (RNs) and UEs unless each RN has scheduling capability. In other words, the DgNB can collect traffic information in all related RNs, determine schedules with respect to all links and then notify each RN of schedule information.

Figure 10:
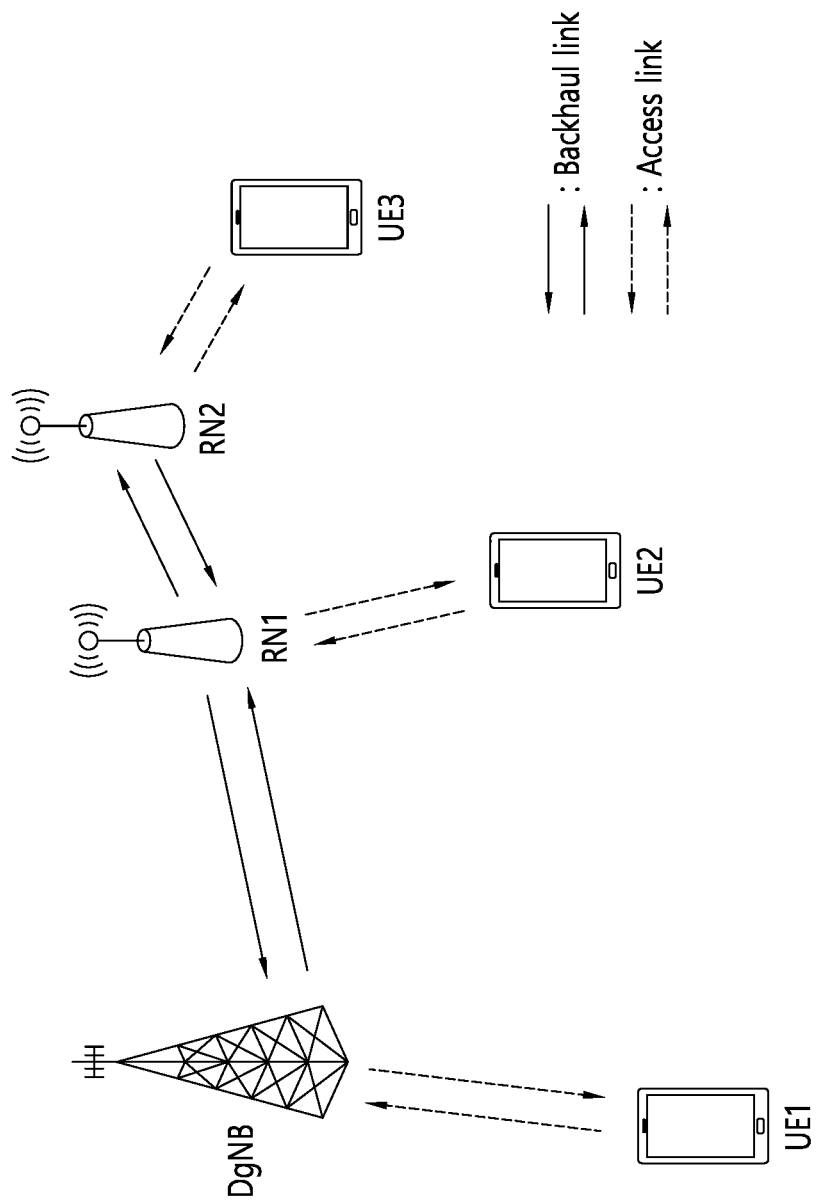
FIG. 10 schematically illustrates an example of a link between a DgNB, an RN, and a UE.

FIG. 10 schematically illustrates an example of a link between a DgNB, an RN, and a UE.

According to FIG. 10, for example, a link between DgNB and UE1 is an access link (access link), a link between RN1 and UE2 is also an access link, and a link between RN2 and UE3 may also mean an access link.

Similarly, according to FIG. 10, for example, a link between DgNB and RN1 and a link between RN1 and RN2 may mean a backhaul link.

For example, backhaul and access links can be configured, and in this case, the DgNB can receive scheduling requests of UE 2 and UE 3 as well as a scheduling request of UE 1. Then, the DgNB can determine scheduling of two backhaul links and three access links and signal the scheduling result. Accordingly, this centralized scheduling includes delayed scheduling and waiting time problems.

On the other hand, distributed scheduling can be performed if each RN has scheduling capability. Then, immediate scheduling can be performed for an uplink scheduling request of a UE and backhaul/access links can be used more flexibly in response to surrounding traffic conditions.

Figure 11:
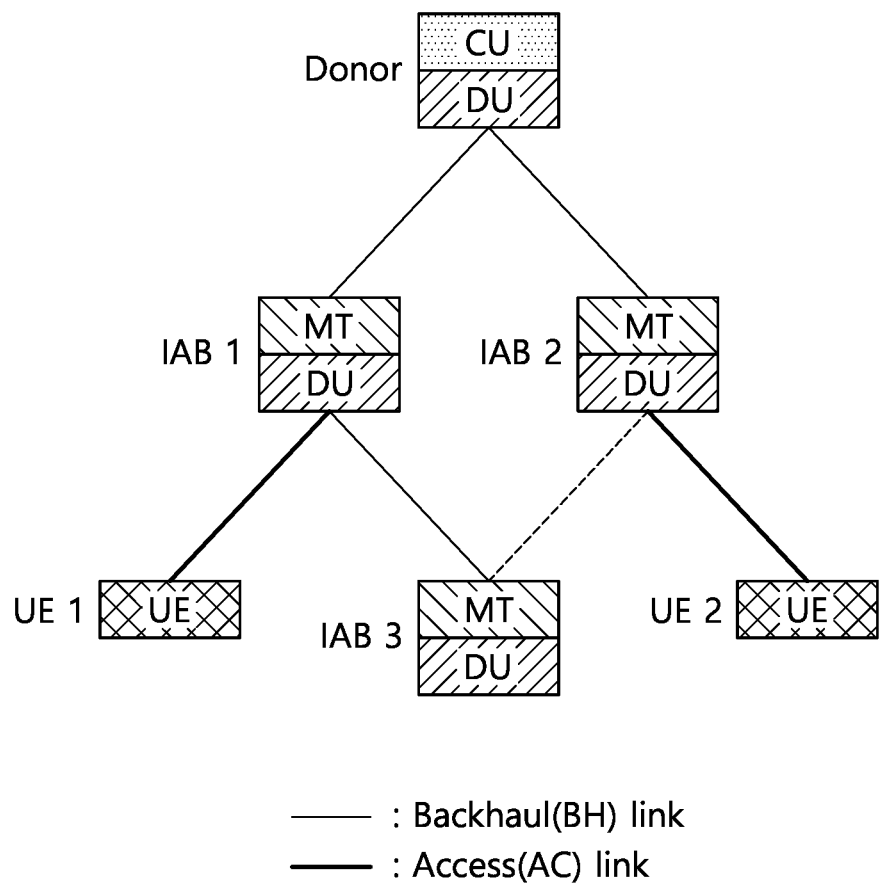
FIG. 11 schematically shows an example of a backhaul link and an access link.

FIG. 11 schematically shows an example of a backhaul link and an access link.

As shown in FIG. 11, a link between a donor node and an IAB node or a link between IAB nodes is called a backhaul link. On the other hand, the link between the donor node and the UE or the link between the IAB node and the UE is called an access link. That is, a link between an MT and a parent DU or a link between a DU and a child MT may be referred to as a backhaul link, and a link between the DU and the UE may be referred to as an access link.

Figure 12:
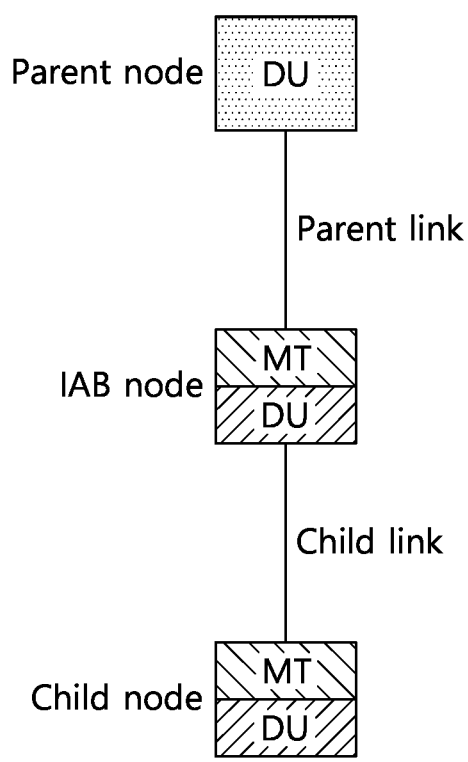
FIG. 12 schematically shows an example of a parent link and a child link.

FIG. 12 schematically shows an example of a parent link and a child link.

As shown in FIG. 12, the link between the IAB node and the parent node is called a parent link, and the link between the IAB node and the child node/UE is called a child link. That is, the link between the MT and the parent DU is called a parent link, and the link between the DU and the child MT/UE is called a child link.

However, depending on the interpretation or perspective, the link between the IAB node and the parent node is called a backhaul link, and the link between the IAB node and the child node/UE is also called an access link.

<IAB Node Synchronization and Timing Alignment>

On the other hand, the feasibility of over-the-air (OTA) synchronization and the impact of timing mismatch on IAB performance (e.g., the number of supportable hops) should be considered.

A mechanism for timing alignment in a multi-hop NR-IAB network may be considered. IAB can support TA-based synchronization between IAB nodes, including multiple backhaul hops. In addition, improvements to the existing timing alignment mechanism may be additionally considered.

Transmission timing alignment across IAB-node(s) and IAB-donor(s) may further consider the following cases.
  Case 1: Alignment of DL transmission timing between IAB node and IAB donor
  Case 2: DL and UL transmission timings are aligned within the IAB node
  Case 3: DL and UL reception timings are aligned within the IAB node
  Case 4: Transmit using case 2 and receive using case 3 within the IAB node
  Case 5: Case 1 for access link timing, and Case 4 for backhaul link timing within IAB nodes in different time slots The following level of alignment between the IAB-node(s)/IAB-donor(s) or within the IAB-node may be further considered.
  Slot level alignment
  Symbol level alignment
  no alignment Hereinafter, the proposal of the present specification will be described.

Additional advantages, objects, and features of the present specification will be set forth in part in the description that follows, and will become apparent to those skilled in the art upon reviewing the following, or may be learned, in part, from the practice of the present specification. The objects and other advantages of the present specification may be realized and attained by means of the appended drawings as well as the claims and structures particularly pointed out in the claims.

The terms used in this specification may be as follows.
  IAB node (IAB-node): a RAN node that supports radio access to the terminal(s) and supports wireless backhaul of access traffic.
  IAB donor (IAB-donor): a RAN node that provides the UE's interface to the core network and wireless backhaul function to the IAB node(s).

Hereinafter, each abbreviation may correspond to an abbreviation of the following terms.
  IAB: Integrated Access and Backhaul
  CSI-RS Channel State Information Reference Signal
  DgNB: Donor gNB
  AC: Access
  BH: Backhaul
  DU: Distributed Unit
  MT: Mobile terminal
  CU: Centralized Unit
  IAB-MT: IAB mobile terminal
  NGC: Next-Generation Core network
  SA: Stand-alone
  NSA: non-stand-alone
  EPC: Evolved Packet Core The content of the present specification is described assuming an in-band environment, but may also be applied in an out-band environment. In addition, the contents of the present specification may be described in consideration of an environment in which a donor gNB (DgNB), a relay node (RN), and a UE perform a half-duplex operation, and the contents of the present specification may be applied even in an environment in which a donor gNB (DgNB), a relay node (RN), and/or a UE perform a full-duplex operation.

In this specification, for convenience of description, when node 1 and node 2 exist, and when node 1 relays data transmitted/received to node 2, node 1 may be referred to as a parent node of node 2, and node 2 may be referred to as a child node of node 1.

In this specification, a method for making the timing advance (TA) used to align the DL transmission timing of IAB nodes in an integrated access and backhaul (IAB) system composed of a plurality of hops into finer granularity may be provided. It is apparent that the embodiments (or features) proposed in this specification are applicable to general wireless communication systems as well as IAB environments.

Hereinafter, the configuration, operation and other features of the present specification may be understood by the embodiments of the present specification described with reference to the accompanying drawings.

Unless otherwise specified, the IAB operation described below (eg, IAB-MT (or IAB-DU)) may support all the operations of the UE described in the 3GPP LTE/LTE-A/NR specification.

For example, an IAB node performing an IAB operation may support cell search, system information acquisition, and/or random access procedures. For example, an IAB node may also support an initial access operation.

For example, as soon as the IAB node (or terminal) receives a timing advance command or a timing adjustment instruction for the TAG, the IAB node (or terminal) may adjust uplink timing for PUSCH/SRS/PUCCH transmission for all serving cells of the TAG based on a value (eg, N_TA_offset) that the IAB node (or terminal) expects to be the same for all serving cells and based on the received timing advance command or timing adjustment instruction. Here, the uplink timing for PUSCH/SRS/PUCCH transmission may be the same for all serving cells of the TAG.

Meanwhile, in relation to the definition of T_delta, it can be arranged as follows.

The IAB node may set the DL TX timing before the DL Rx timing by TA/2+T_delta.

Here, T_delta may be signaled from the parent node. Here, this value is to consider factors such as the offset between the parent DL Tx and the UL Rx due to factors such as Tx to Rx transition time or HW damage.

TA may be a timing interval between UL Tx timing and DL Rx timing.

In addition, the following configurations can also be considered.
  1) T_delta value range and granularity.
  2) Aperiodic/periodic update of T_delta is required.

3) Other timing impediments to adjust the IAB node timing to be included in T_delta.

4) Timing alignment when an IAB node has multiple parents.

Additionally, in relation to the IAB, the following configurations may also be provided.

T_delta may be defined as T_delta=−Tg/2. Here, N_TA_offset may vary according to a frequency range and an FDD/TDD scenario.

The granularity of T_delta for FR1 may be 64Tc.

The granularity of T_delta for FR2 may be 32Tc. (Here, Tc may be a basic timing unit defined in the specification. For example, Tc may be equal to 1/(Δf_max*N_f), where Δf_max is 480*10^3 (Hz), and N_f may be 4096).

In the above content, the granularity of T_delta may be ¼-1/16 of the TA granularity according to SCS (subcarrier spacing). That is, the granularity of T_delta has a finer granularity than that of TA granularity.

In addition, the definition of T_delta may include offset information related to the DL Tx and UL Rx timing gaps of the parent node, so that the value of the information may not change frequently compared to the TA.

Therefore, according to the RAN1 agreement, since the case of the DL tx timing of the child node, it is assumed that TA/2+T_delta is advanced from the DL Rx timing in the case of the DL tx timing of the child node, if the granularity and update period of TA and T_delta are different, it may be difficult to adjust the target DL Tx timing to a required accuracy level using the above values.

In the present specification, a method of setting and/or applying a TA for such DL Tx timing is proposed.

In one way, the TA granularity may be lowered (e.g., the same as T_delta granularity) by limiting the case of using the DL Tx timing or using the IAB nodes.

As an example, a method of increasing the bit-width of the TA command delivered to the MAC CE and/or making the granularity fine may be provided.

Hereinafter, for a better understanding of the examples of the present specification, the disclosure of the present specification will be described with reference to the drawings. The following drawings were created to explain a specific example of the present specification. Since the names of specific devices described in the drawings or the names of specific signals/messages/fields are presented by way of example, the technical features of the present specification are not limited to the specific names used in the following drawings.

Figure 13:
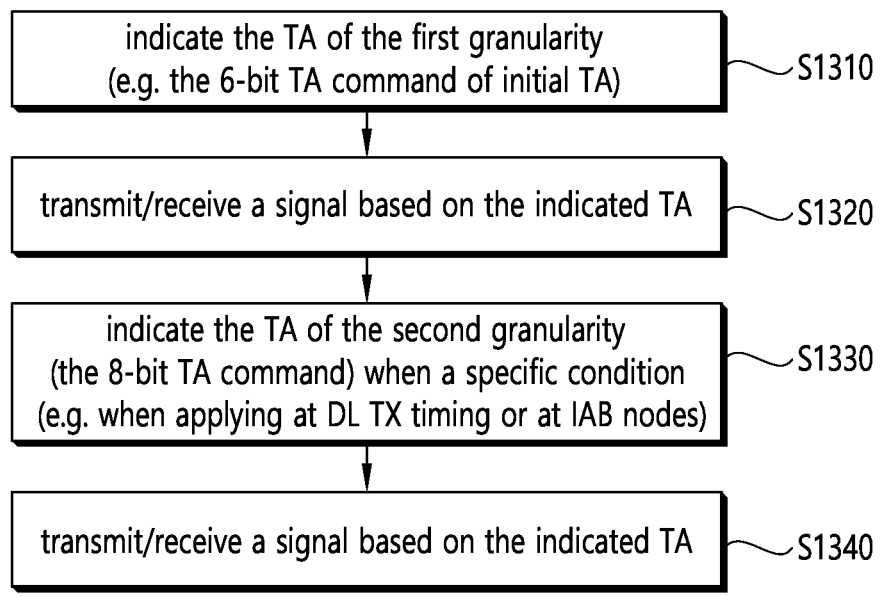
FIG. 13 is a flowchart for an example of setting/applying a TA.

FIG. 13 is a flowchart for an example of setting/applying a TA.

According to FIG. 13, the IAB node may indicate the TA of the first granularity (to the child node and/or the terminal) (S1310). Here, for example, when the IAB node indicates the initial TA (indicates the TA of the first granularity), the IAB node may indicate the 6-bit TA command to the child node and/or the terminal. Since more specific examples of the present content are the same as those described above and/or will be described later, repeated descriptions of overlapping content will be omitted.

The IAB node may transmit/receive a signal based on the TA (e.g. the TA of the first granularity) (indicated) (S1320). Since more specific examples of the present content are the same as those described above and/or will be described later, repeated descriptions of overlapping content will be omitted.

When a specific condition is satisfied, the IAB node may indicate the TA of the second granularity (to the child node and/or the terminal) (S1330). Here, for example, the above specific condition may include a case of applying to DL transmission timing or applying to IAB nodes. Also, for example, when the IAB node indicates the TA of the second granularity, an 8-bit TA command may be instructed to the child node and/or the terminal. Since more specific examples of the present content are the same as those described above and/or will be described later, repeated descriptions of overlapping content will be omitted.

The IAB node may transmit/receive a signal based on the TA (e.g. TA of the second granularity) (indicated) (S1340). Since more specific examples of the present content are the same as those described above and/or will be described later, repeated descriptions of overlapping content will be omitted.

The above can be described in more detail as follows.

As an example of the above method, the TA command after the initial TA may be modified as follows (e.g., 6 bits->8 bits).

$$N_{TA\_new} = N_{TA\_old} + \alpha(T_A - \beta) \cdot 16 \cdot 64/2^\mu$$

Here, T_A=0, 1, 2, ..., 255 may be. Also, here, a may be a value fixed to the specification or may be set from a higher layer (e.g., α=1/4). Also, it can be $$\beta = \left\lfloor \frac{\max(T_A)}{2} \right\rfloor$$

(beta=127 in the above example)

The bit-width of the TA may also be changed according to the a value set in the above embodiment. For example, when the bit width of the TA is 6 bits, α=1. As in the above example, when α=¼, the bit-width of the TA can be 8 bits.

Alternatively, the value may be changed in conjunction with the SCS. For example, when SCS=15 kHz, α=⅛, when SCS=30 kHz, α=¼ may be set/applied. By doing this, the granularity of TA varies according to the SCS, but as described above, the granularity of T_delta is fixed at a specific value (e.g., 64 Tc for FR1), by interlocking this with SCS, the granularity of TA (for DL Tx timing adjustment) is to be equal to the granularity of T_delta or to make a more dense granularity than that of T_delta.

If the above contents are explained through drawings, it can be as follows.

Figure 14:
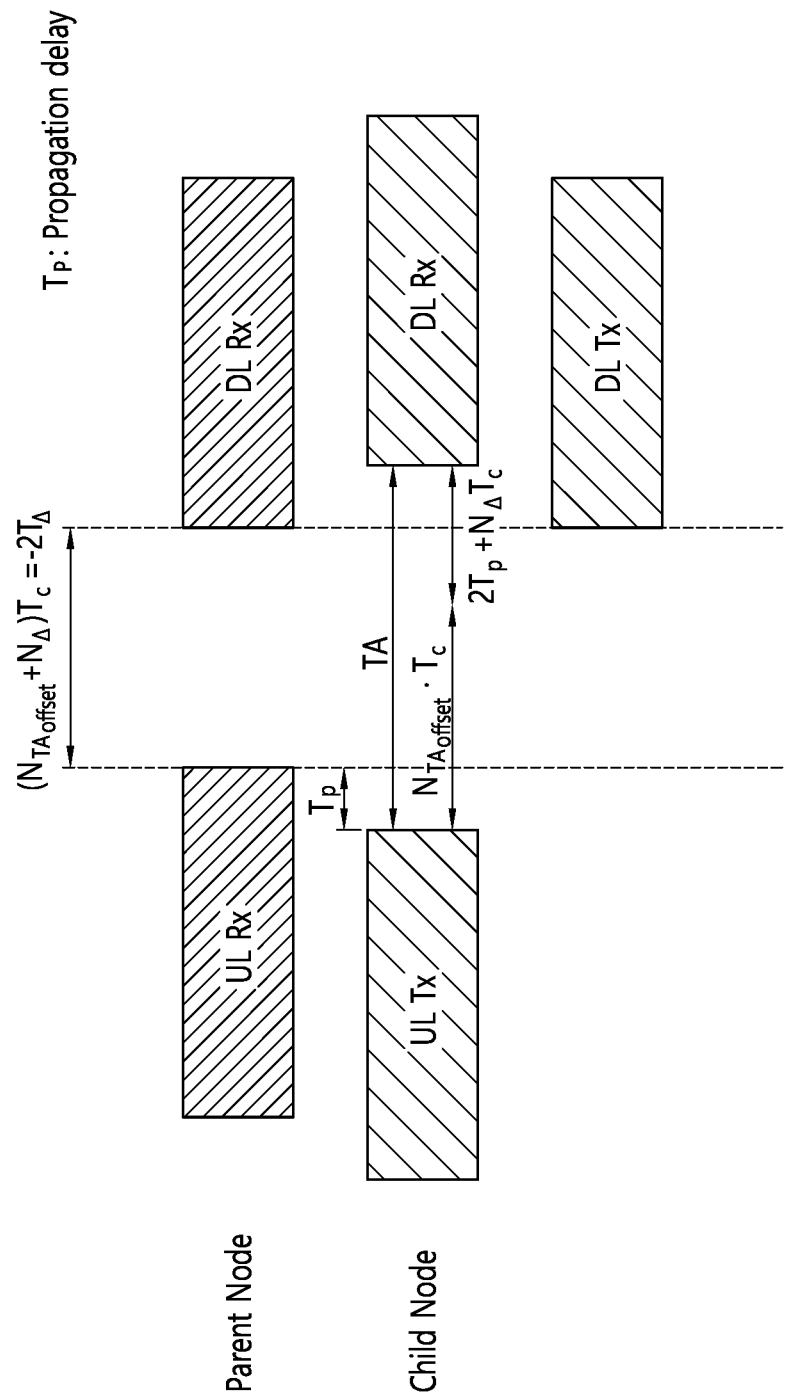
FIG. 14 schematically illustrates an example of DL timing alignment in TDD when $N\_\Delta>0$.

FIG. 14 schematically illustrates an example of DL timing alignment in TDD when N_Δ>0.

According to FIG. 14, the interval between the UL RX and DL TX of the parent node may be arranged as (N_TA_offset+N_Δ)*T_c=−2*T_Δ.

In addition, the interval between the UL TX and DL RX of the child node may be organized as TA=N_TA_offset*T_c+2*T_p+N_Δ*T_c.

On the other hand, a method for setting and/or instructing the fine granularity of the TA by a combination of a plurality of TA commands in a manner to create the fine granularity of the TA may be provided.

Hereinafter, for a better understanding of the examples of the present specification, the disclosure of the present specification will be described with reference to the drawings. The following drawings were created to explain a specific example of the present specification. Since the names of specific devices described in the drawings or the names of specific signals/messages/fields are presented by way of example, the technical features of the present specification are not limited to the specific names used in the following drawings.

Figure 15:
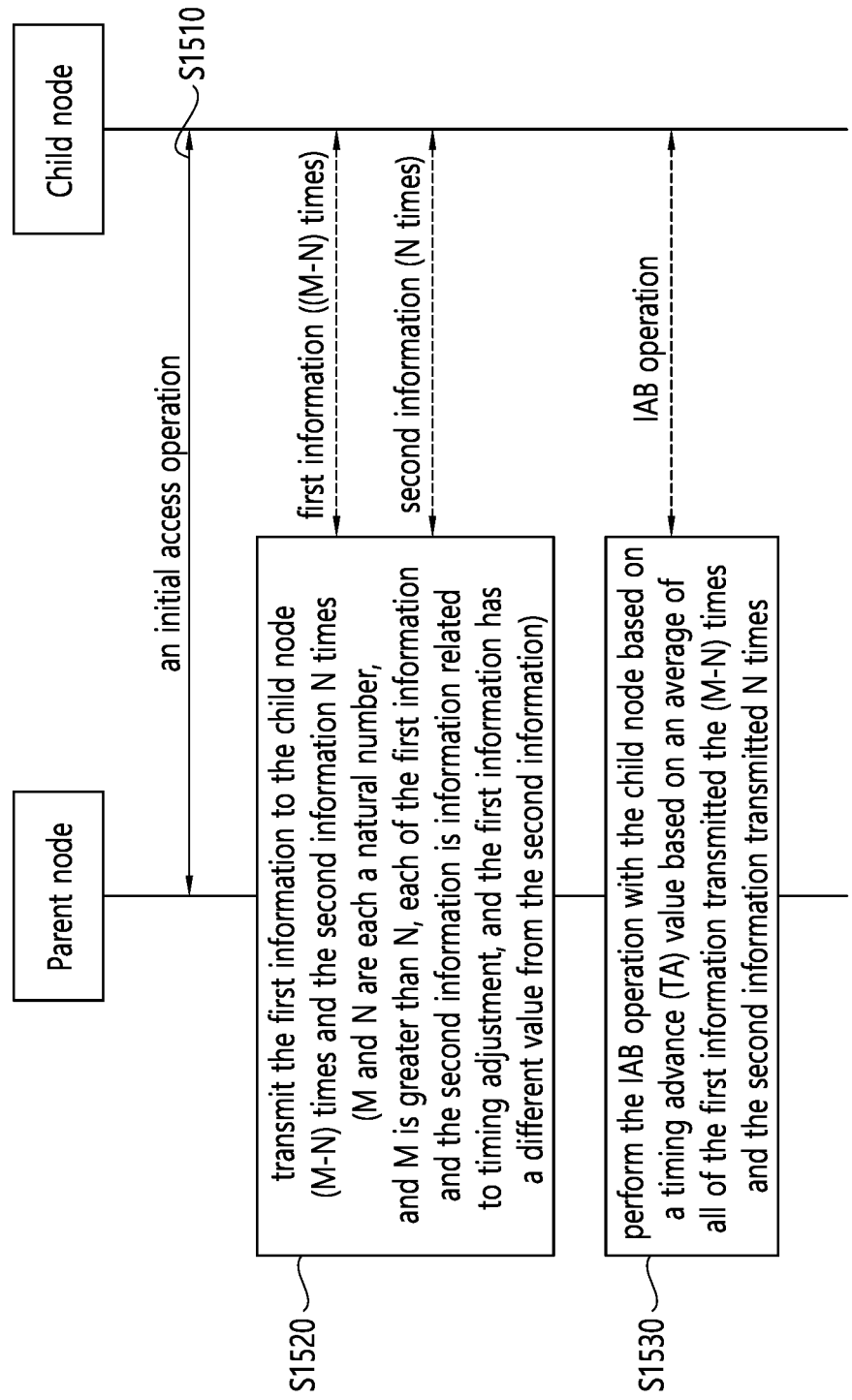
FIG. 15 is a flowchart of a method of performing an IAB operation, according to an embodiment of the present specification.

FIG. 15 is a flowchart of a method of performing an IAB operation, according to an embodiment of the present specification.

According to FIG. 15, an IAB node may perform an initial access operation with a child node (S1510). Since more specific examples of the present content are the same as those described above and/or will be described later, repeated descriptions of overlapping content will be omitted.

The IAB node may transmit the first information to the child node (M-N) times and the second information N times (S1520). Here, M and N are each a natural number, and M is greater than N, each of the first information and the second information is information related to timing adjustment, and the first information may have a different value from the second information. Since more specific examples of the present content are the same as those described above and/or will be described later, repeated descriptions of overlapping content will be omitted.

The IAB node may perform the IAB operation with the child node based on a timing advance (TA) value based on an average of all of the first information transmitted the (M-N) times and the second information transmitted N times (S1530). Since more specific examples of the present content are the same as those described above and/or will be described later, repeated descriptions of overlapping content will be omitted.

For example, each of the first information and the second information may be TA command information. Since more specific examples of the present content are the same as those described above and/or will be described later, repeated descriptions of overlapping content will be omitted.

For example, the TA command information may be delivered through a MAC (medium access control) CE (control element). Since more specific examples of the present content are the same as those described above and/or will be described later, repeated descriptions of overlapping content will be omitted.

For example, the first information may have a value of X, the second information may have a value of (X+1), and X may be a natural number. Since more specific examples of the present content are the same as those described above and/or will be described later, repeated descriptions of overlapping content will be omitted.

For example, the IAB operation may include an MT (mobile terminal) operation or a DU (distributed unit) operation. Here, for example, the MT operation may be an operation related to communication between the node and a parent node, and the DU operation may be an operation related to communication between the node and the child node or communication between the node and a terminal. Here, for example, each of the node, the parent node, and the child node may be an IAB node. Since more specific examples of the present content are the same as those described above and/or will be described later, repeated descriptions of overlapping content will be omitted.

On the other hand, the example of FIG. 15 may be interpreted as a method for performing transmission or reception of data performed by a device in a wireless communication system, the method comprising performing initial access operations with other devices, transmitting the first information (M-N) times and the second information N times to the other device, M and N are each a natural number, M is greater than N, and each of the first information and the second information is information related to timing adjustment, the first information has a value different from that of the second information, and performing transmission or reception of the data with the other device based on a timing advance (TA) value based on an average of the total of the first information transmitted the (M-N) times and the second information transmitted N times.

That is, the operation provided in the present specification is not necessarily limited only to the IAB operation. For example, it can be used when the base station (e.g. eNB, gNB) instructs the UE to fine (target) TA.

Meanwhile, as an example, the device is a node, and the other device is a child node, and the transmission or reception of the data may be performed based on an integrated access and backhaul (IAB) operation.

Hereinafter, the present content will be described in more detail.

For example, it is assumed that the propagation delay (Tp) of the child node and the parent node is 10.333 units (e.g., Tc). In the case of T_delta, by definition, when T_gap of the parent node is defined as T_gap=(DL Tx timing−UL Rx timing) as in FIG. 14, T_delta=−1/2*T_gap.

Assuming that the parent selects a value in which the target value of T_delta is discrete, for example, it can be assumed that the target value of T_delta is set to −1.0 unit. Then, the value of the estimated propagation delay may be calculated as avg(TA/2)+avg(T_delta). Here, avg is a representative example of a value obtained by filtering a plurality of TA and T_delta samples, meaning that the average is taken using values of all samples (or samples within a specific window). When a stable T_delta is obtained by the average and the avg(T_delta) value is equal to the target T_delta, the above-described formula can be rearranged as follows.

The TA value must be set so that avg(TA/2)=T_propagation−T_delta_target=10.333 units+1.0 units=11.333 units. That is, it should be set so that avg(TA)=22.666 units. For this purpose, since the TA command that the parent node instructs to the child node has a discrete integer value, for example, 22, 23, 23, 22, 23, 23, etc., the TA command should be instructed to the child node with the frequency of 22 once and 23 twice.

In a child node, it is necessary to know by what standard the parent node controls such TA. If TA is 22, the instantaneous value of T_delta becomes 10.333−11=−0.667 units, if TA is 23, it becomes 10.333−11.5=−1.167 units, so it has a target value that avg(T_delta) converges to 1.0 unit, it can be seen that the combination of the values, that is, 22 is adjusted once by 23 and twice.

That is, according to the embodiment of the present specification, it is not necessary to make the granularity of the TA as dense as the granularity of the T_delta, and fine adjustment of the DL Tx timing is possible through the control of the TA command The method can be generalized as follows.

Proposal 1: When it is necessary to set/indicate the target TA value in (X+N/M) units (that is, to set a finer TA value than the granularity that can be set), the TA command sets/indicates the TA value at the frequency of (on average) (M-N) times for the X value and N times for the (X+1) value. Here, X may be an integer value, and N and M may be positive integers satisfying N<M.

When using the TA control for DL timing adjustment (adjustment), for target TA control, for example, with an N_TA_ref value as a target, the parent node issues a TA command (i.e., N_TA by MAC CE) to the child node.

If, (base station implementation) moves little by little to the target N_TA_ref value (e.g., N_TA_ref=16 Ts, if N_TA is lowered to move 1 Ts per slot), before moving to the target N_TA_ref value, since UL transmission of a child node is highly likely to occur frequently, there is a high possibility that the signal is received at a slightly different timing before the UL signal is received at the expected (UL Rx) timing after the parent transmits the TA command To this end, the specification proposes the following.

Proposal 1-1: When targeting a timing advance value of X+N/M (where X is an integer, N and M are integers where N<M), while maintaining the ratio of (M−N):N, the ratio of the sojourn period to which the TA command to pursue X and the TA command to pursue X+1 are effectively applied, the parent calculates avg(T_delta) by averaging all timings whenever a UL signal is received from a child node.

As a modified example of the proposals 1 and 1-1, a restriction on UL signal transmission of a child node may also be considered. In other words, the UL transmission of the child node is performed when every TA command is issued, there may be a method of allowing transmission only when N_TA_ref is secured (e.g., when it comes within the error limit range Te).

Hereinafter, for the aid of understanding of the embodiments of the present specification, with respect to the error limit range, the requirements of the terminal transmission timing will be schematically described.

The terminal should be able to have the ability to follow the frame timing change of the reference cell in the connected state. Before receiving the first sensed path (time) of the corresponding downlink frame from the reference cell, the uplink frame transmission may be at (N_TA+N_TA_offset)*T_c.

The terminal transmission timing may have the following requirements.

The terminal initial transmission timing error should be less than or equal to +−Te when Te, which is a timing error limit value, is specified as shown in the table below.

TABLE 4

| Frequency Range | SCS of SSB signals (KHz) | SCS of uplink signals s(KHz) | $T_e$ |
| --- | --- | --- | --- |
| 1 | 15 | 15 | $12*64*T_c$ |
|   |    | 30 | $10*64*T_c$ |
|   |    | 60 | $10*64*T_c$ |
|   | 30 | 15 | $8*64*T_c$ |
|   |    | 30 | $8*64*T_c$ |
|   |    | 60 | $7*64*T_c$ |
| 2 | 120 | 60 | $3.5*64*T_c$ |
|   |     | 120 | $3.5*64*T_c$ |
|   | 240 | 60 | $3*64*T_c$ |
|   |     | 120 | $3*64*T_c$ |

$T_c$ is the basic timing unit

In the case of the above requirements, it may be applied to the first transmission of the DRX cycle for PUCCH, PUSCH, and SRS, or to the case of PRACH transmission.

On the other hand, the terminal may have to satisfy the Te requirement for initial transmission when at least one SSB is available in the terminal during the last 160 ms. The reference point for the UE initial transmission timing control request may be a value obtained by subtracting (N_TA+N_TA_offset)*T_c from the reference downlink timing.

Back to the proposal of the present specification, another way to provide an embodiment of the present specification, at the moment when N_TA_ref is secured, the child node notifies the parent node through an additional signal or flag, since the parent node can know which UL transmission N_TA_ref is secured, in case of UL transmission without the additional signal or flag, there is a method of excluding the parent node from calculating T_delta and/or TA average, or taking a very low weight value.

In the case of proposal 1-1, a parent node may issue (or may transmit) a TA command (to a child node) at a rate such that it stays on average for a (M−N) time-period targeting a timing reference corresponding to X (unit, e.g., Ts) and stays on average for a N time-period targeting a timing reference corresponding to (X+1) (unit, e.g., Ts), thereafter, the parent node may estimate T_propagation=avg(TA/2)+avg (T_delta), which is estimated by averaging all UL reception timings Meanwhile, the child node may average all UL transmission timings (or TA/2 during transmission) (i.e., avg(TA/2)) and use it for DL Tx timing adjustment.

The above proposal can be extended and applied to a mobile IAB (or mobile relay) environment, when applied to the mobile IAB environment, the final DL Tx timing may be estimated/calculated/applied as DL_TX_timing=avg (DL_RX_timing)−(avg(TA/2)+avg(T_delta)).

Since avg (T_delta) can converge to T_delta_target through the proposed method(s), for the value that the parent node signals to the child node, there may be no problem in operation even if either one of the two values (e.g. avg (T_delta) or T_delta_target) is used. However, the value that the parent node should signal is more accurate than T_delta_target rather than avg(T_delta) averaged directly from the parent node.

Effects that can be obtained through specific examples of the present specification are not limited to the effects listed above. For example, various technical effects that a person having ordinary skill in the related art can understand or derive from the present specification may exist. Accordingly, the specific effects of the present specification are not limited to those explicitly described herein, and may include various effects that can be understood or derived from the technical characteristics of the present specification.

On the other hand, if the contents to which the above-described examples are applied from the point of view of a (child) node, it may be as follows.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 16:
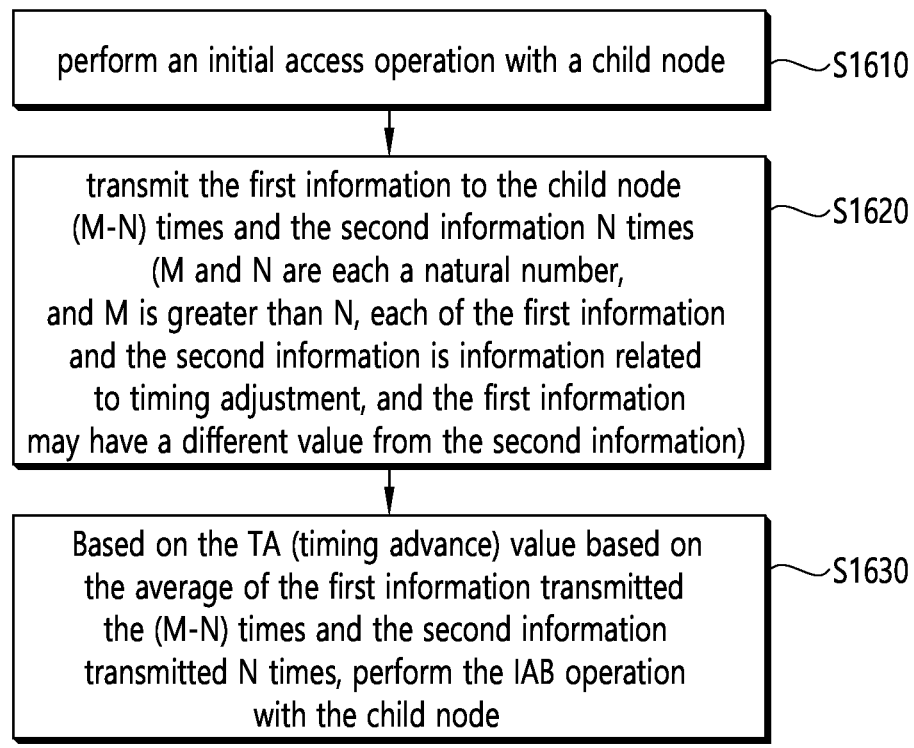
FIG. 16 is a flowchart of a method of performing an IAB operation from a parent node perspective, according to an embodiment of the present specification.

FIG. 16 is a flowchart of a method of performing an IAB operation from a parent node perspective, according to an embodiment of the present specification.

According to FIG. 16, a node may perform an initial access operation with a child node (S1610). In this regard, a more specific embodiment is the same as described above (and will be described later), so for convenience of description, repeated description of overlapping content will be omitted.

The node may transmit the first information to the child node (M−N) times and the second information N times (S1620). Here, M and N are each a natural number, and M is greater than N, each of the first information and the second information is information related to timing adjustment, and the first information may have a different value from the second information. In this regard, a more specific embodiment is the same as described above (and will be described later), so for convenience of description, repeated description of overlapping content will be omitted.

Based on the TA (timing advance) value based on the average of the first information transmitted the (M−N) times and the second information transmitted N times, the node may perform the IAB operation with the child node (S1630). Since a more specific embodiment is the same as that described above (and will be described later), repeated description of overlapping content will be omitted for convenience of description.

Figure 17:
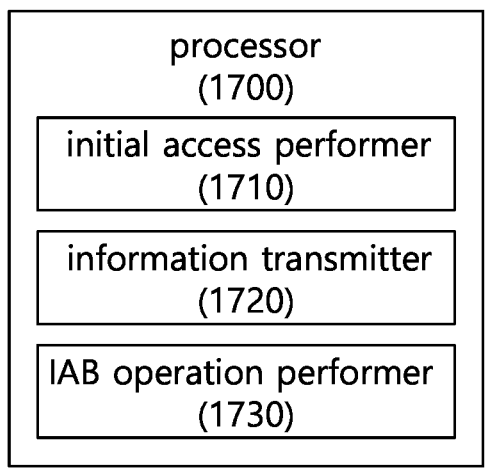
FIG. 17 is a block diagram of an example of an apparatus for performing an IAB operation from a parent node perspective, according to an embodiment of the present specification.

FIG. 17 is a block diagram of an example of an apparatus for performing an IAB operation from a parent node perspective, according to an embodiment of the present specification.

Referring to FIG. 17, the processor 1700 may include an initial access performer 1710, an information transmitter 1720, and an IAB operation performer 1730. Here, the processor may correspond to a processor in FIGS. 20 to 26 to be described later.

The initial access performer 1710 may be configured to perform an initial access operation with a child node. In this regard, a more specific embodiment is the same as described above (and will be described later), so for convenience of description, repeated description of overlapping content will be omitted.

The information transmitter 1720 may be configured to control the transceiver to transmit the first information (M−N) times and the second information N times to the child node. Here, M and N are each a natural number, and M is greater than N, each of the first information and the second information is information related to timing adjustment, and the first information may have a different value from the second information. Since a more specific embodiment is the same as that described above (and will be described later), repeated description of overlapping content will be omitted for convenience of description.

IAB operation performer 1730 may be configured to perform the IAB operation with the child node based on a timing advance (TA) value based on an average of all of the first information transmitted the (M−N) times and the second information transmitted N times. In this regard, a more specific embodiment is the same as described above (and will be described later), for convenience of description, repeated description of overlapping content will be omitted.

Meanwhile, although not shown separately, the present specification may also provide the following embodiments.

In an aspect, an apparatus is provided. The apparatus may comprise at least one memory and at least one processor operatively coupled with the at least one memory, the at least one processor configured to perform an initial access operation with an another apparatus, control a transceiver to transmit, to the another apparatus, first information (M−N) times and second information N times, wherein each of the M and the N is a nature number, wherein the M is greater than the N, wherein each of the first information and the second information is related to adjustment of timing, wherein the first information has a different value from the second information and performing a transmission or a reception of a data with the another apparatus based on a timing advance (TA) value based on an average of all of the first information transmitted the (M−N) times and the second information transmitted N times.

In another aspect, at least one computer readable medium may be provided. The at least one computer readable medium may include instructions based on being executed by at least one processor, the at least one processor configured to perform an initial access operation with an another apparatus, control a transceiver to transmit, to the another apparatus, first information (M−N) times and second information N times, wherein each of the M and the N is a nature number, wherein the M is greater than the N, wherein each of the first information and the second information is related to adjustment of timing, wherein the first information has a different value from the second information and performing a transmission or a reception of a data with the another apparatus based on a timing advance (TA) value based on an average of all of the first information transmitted the (M−N) times and the second information transmitted N times.

Figure 18:
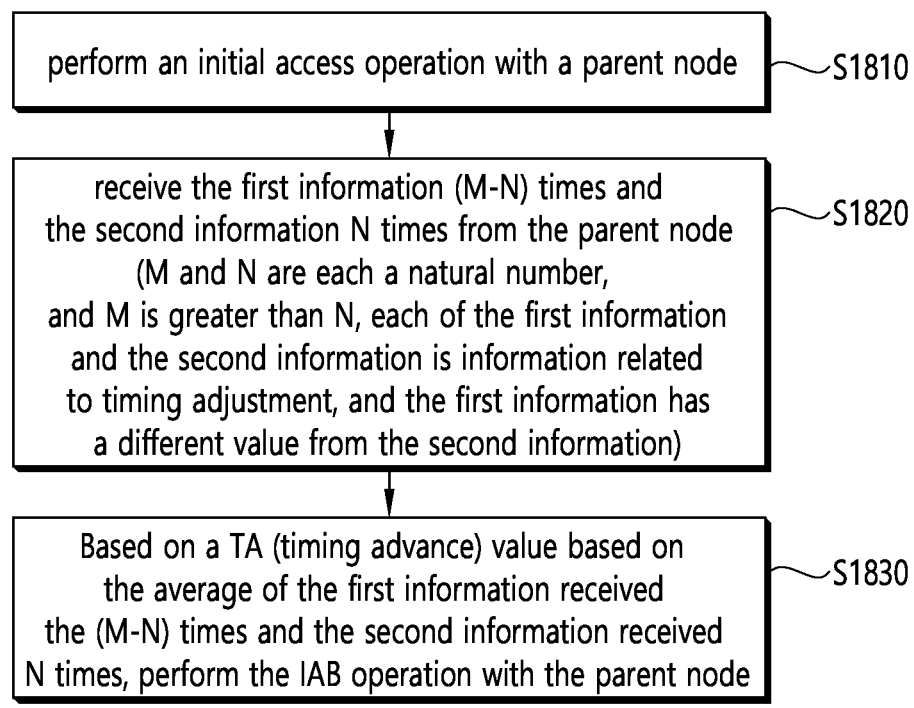
FIG. 18 is a flowchart of a method of performing an IAB operation from the point of view of a child node, according to an embodiment of the present specification.

FIG. 18 is a flowchart of a method of performing an IAB operation from the point of view of a child node, according to an embodiment of the present specification.

Referring to FIG. 18, a node may perform an initial access operation with a parent node (S1810). In this regard, a more specific embodiment is the same as described above (and will be described later), so for convenience of description, repeated description of overlapping content will be omitted.

The node may receive the first information (M−N) times and the second information N times from the parent node (S1820). Here, M and N are each a natural number, and M is greater than N, each of the first information and the second information is information related to timing adjustment, and the first information may have a different value from the second information. Since a more specific embodiment is the same as that described above (and will be described later), repeated description of overlapping content will be omitted for convenience of description.

Based on a TA (timing advance) value based on the average of the first information received the (M−N) times and the second information received N times, the node may perform the IAB operation with the parent node (S1830). In this regard, a more specific embodiment is the same as described above (and will be described later), so for convenience of description, repeated description of overlapping content will be omitted.

Figure 19:
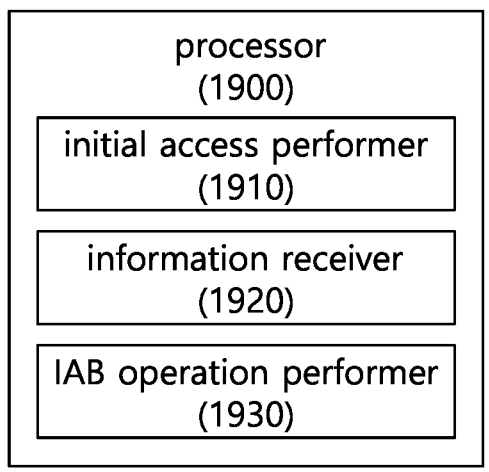
FIG. 19 is a block diagram of an example of an apparatus for performing an IAB operation from the point of view of a child node, according to an embodiment of the present specification.

FIG. 19 is a block diagram of an example of an apparatus for performing an IAB operation from the point of view of a child node, according to an embodiment of the present specification.

Referring to FIG. 19, a processor 1900 may include an initial access performer 1910, an information receiver 1920, and an IAB operation performer 1930. Here, the processor may correspond to a processor in FIGS. 20 to 26 to be described later.

The initial access performer 1910 may be configured to perform an initial access operation with a parent node. Since a more specific embodiment is the same as that described above (and will be described later), repeated description of overlapping content will be omitted for convenience of description.

The information receiver 1920 may be configured to control the transceiver to receive the first information (M−N) times and the second information N times from the parent node. Here, M and N are each a natural number, M is greater than N, each of the first information and the second information is information related to timing adjustment, and the first information may have a different value from the second information. Since a more specific embodiment is the same as that described above (and will be described later), repeated description of overlapping content will be omitted for convenience of description.

The IAB operation performer 1930 may be configured to perform the IAB operation with the parent node based on a timing advance (TA) value based on an average of all the first information received the (M−N) times and the second information received N times. Since a more specific embodiment is the same as that described above (and will be described later), repeated description of overlapping content will be omitted for convenience of description.

Figure 20:
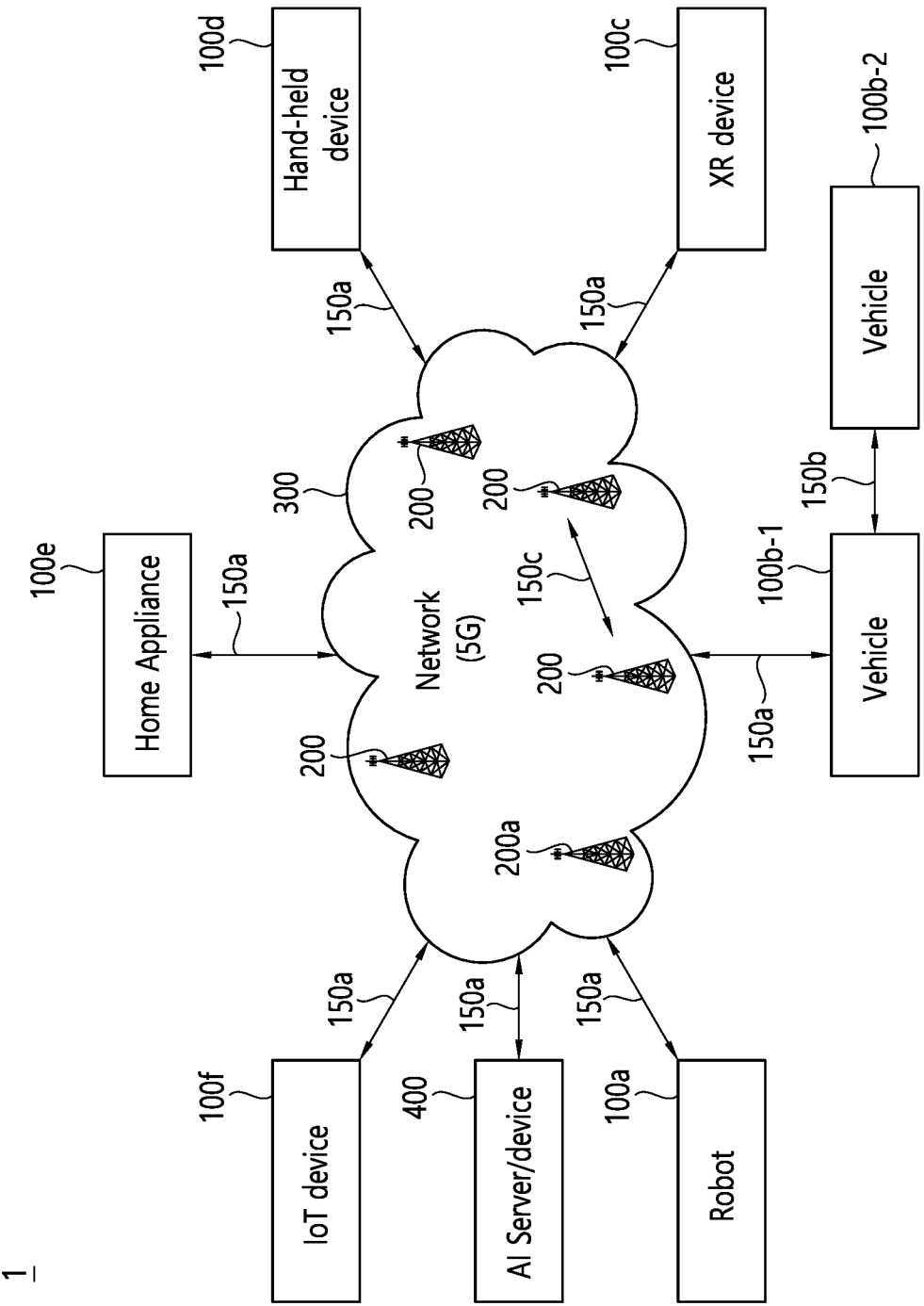
FIG. 20 shows an exemplary communication system (1), according to an embodiment of the present specification.

FIG. 20 shows an exemplary communication system (1), according to an embodiment of the present specification.

Referring to FIG. 20, a communication system (1) to which various embodiments of the present specification are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot (100a), vehicles (100b-1, 100b-2), an eXtended Reality (XR) device (100c), a hand-held device (100d), a home appliance (100e), an Internet of Things (IoT) device (100f), and an Artificial Intelligence (AI) device/server (400). For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, and so on. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device (200a) may operate as a BS/network node with respect to other wireless devices.

Here, the wireless communication technology implemented in the wireless device of the present specification may include a narrowband Internet of Things for low-power communication as well as LTE, NR, and 6G. At this time, for example, NB-IoT technology may be an example of LPWAN (Low Power Wide Area Network) technology, and may be implemented in standards such as LTE Cat NB1 and/or LTE Cat NB2, and is limited to the above-mentioned names. not. Additionally or alternatively, the wireless communication technology implemented in the wireless device of the present specification may perform communication based on LTE-M technology. In this case, as an example, the LTE-M technology may be an example of an LPWAN technology, and may be called by various names such as enhanced machine type communication (eMTC). For example, LTE-M technology is 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) may be implemented in at least one of various standards such as LTE M, and is not limited to the above-described name. Additionally or alternatively, the wireless communication technology implemented in the wireless device of the present specification may include at least one of ZigBee, Bluetooth, and Low Power Wide Area Network (LPWAN) considering low power communication. and is not limited to the above-mentioned names. For example, the ZigBee technology can create PAN (personal area networks) related to small/low-power digital communication based on various standards such as IEEE 802.15.4, and can be called by various names.

The wireless devices (100a~100f) may be connected to the network (300) via the BSs (200). An Artificial Intelligence (AI) technology may be applied to the wireless devices (100a~100f) and the wireless devices (100a~100f) may be connected to the AI server (400) via the network (300). The network (300) may be configured using a 3G network, a 4G (e.g., LTE) network, or a 5G (e.g., NR) network. Although the wireless devices (100a~100f) may communicate with each other through the BSs (200)/network (300), the wireless devices (100a~100f) may perform direct communication (e.g., sidelink communication) with each other without passing through the BSs/network. For example, the vehicles (100b-1, 100b-2) may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices (100a~100f).

Wireless communication/connections (150a, 150b, 150c) may be established between the wireless devices (100a-100f)/BS (200), or BS (200)/BS (200). Herein, the wireless communication/connections may be established through various RATs (e.g., 5G NR) such as uplink/downlink communication (150a), sidelink communication (150b) (or D2D communication), or inter BS communication (150c) (e.g., relay, Integrated Access Backhaul (IAB)). The wireless devices and the BSs/the wireless devices may transmit/receive radio signals to/from each other through the wireless communication/connections (150a, 150b, 150c). For example, the wireless communication/connections (150a, 150b, 150c) may transmit/receive signals through various physical channels. For this, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present specification.

Meanwhile, in NR, multiple numerologies (or subcarrier spacing (SCS)) for supporting various 5G services may be supported. For example, in case an SCS is 15 kHz, a wide area of the conventional cellular bands may be supported, and, in case an SCS is 30 kHz/60 kHz dense-urban, lower latency, and wider carrier bandwidth may be supported. In case the SCS is 60 kHz or higher, a bandwidth that is greater than 24.25 GHz may be used in order to overcome phase noise.

An NR frequency band may be defined as two different types of frequency ranges (FR1, FR2). The values of the frequency ranges may be changed (or varied), and, for example, the two different types of frequency ranges (FR1, FR2) may be as shown below in Table 5. Among the frequency ranges that are used in an NR system, FR1 may mean a "sub 6 GHz range", and FR2 may mean an "above 6 GHz range" and may also be referred to as a millimeter wave (mmW).

TABLE 5

| FrequencyRange designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 6, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 may include an unlicensed band. The unlicensed band may be used for various purposes, e.g., the unlicensed band for vehicle-specific communication (e.g., automated driving).

TABLE 6

| FrequencyRange designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 21:
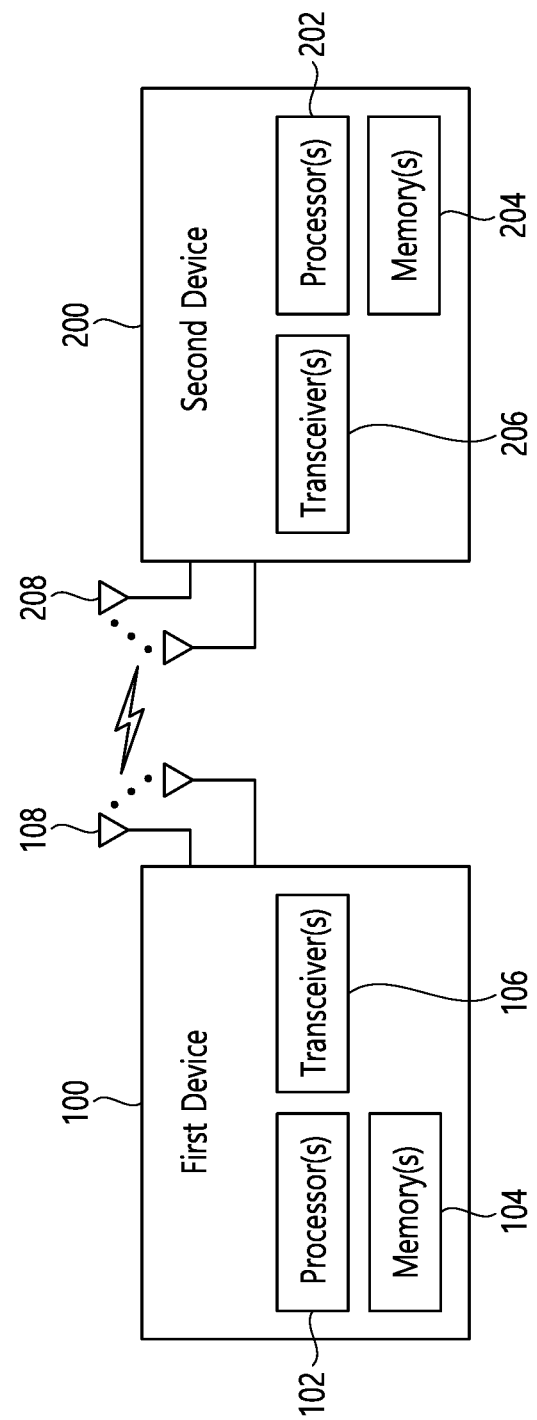
FIG. 21 shows an exemplary wireless device to which the present specification can be applied.

Hereinafter, an example of wireless devices to which the present specification is applied will be described in detail. FIG. 21 shows an exemplary wireless device to which the present specification can be applied. Referring to FIG. 21, a first wireless device (100) and a second wireless device (200) may transmit radio signals through a variety of RATs (e.g., LTE, NR). Herein, {the first wireless device (100) and the second wireless device (200)} may correspond to {the wireless device (100x) and the BS (200)} and/or {the wireless device (100x) and the wireless device (100x)} of FIG. 20.

The first wireless device (100) may include one or more processors (102) and one or more memories (104) and additionally further include one or more transceivers (106) and/or one or more antennas (108). The processor(s) (102) may control the memory(s) (104) and/or the transceiver(s) (106) and may be configured to implement the descriptions, functions, procedures, proposals, methods, and/or operational flowcharts disclosed in this document. For example, the processor(s) (102) may process information within the memory(s) (104) to generate first information/signals and then transmit radio signals including the first information/signals through the transceiver(s) (106). The processor(s) (102) may receive radio signals including second information/signals through the transceiver (106) and then store information obtained by processing the second information/signals in the memory(s) (104). The memory(s) (104) may be connected to the processor(s) (102) and may store various information related to operations of the processor(s) (102). For example, the memory(s) (104) may store software code including instructions for performing a part or the entirety of processes controlled by the processor(s) (102) or for performing the descriptions, functions, procedures, proposals, methods, and/or operational flowcharts disclosed in this document. Herein, the processor(s) (102) and the memory(s) (104) may be a part of a communication modem/circuit/chip designed to implement RAT (e.g., LTE or NR). The transceiver(s) (106) may be connected to the processor(s) (102) and transmit and/or receive radio signals through one or more antennas (108). Each of the transceiver(s) (106) may include a transmitter and/or a receiver. The transceiver(s) (106) may be interchangeably used with Radio Frequency (RF) unit(s). In the present specification, the wireless device may represent a communication modem/circuit/chip.

The second wireless device (200) may include one or more processors (202) and one or more memories (204) and additionally further include one or more transceivers (206) and/or one or more antennas (208). The processor(s) (202) may control the memory(s) (204) and/or the transceiver(s) (206) and may be configured to implement the descriptions, functions, procedures, proposals, methods, and/or operational flowcharts disclosed in this document. For example, the processor(s) (202) may process information within the memory(s) (204) to generate third information/signals and then transmit radio signals including the third information/signals through the transceiver(s) (206). The processor(s) (202) may receive radio signals including fourth information/signals through the transceiver(s) (206) and then store information obtained by processing the fourth information/signals in the memory(s) (204). The memory(s) (204) may be connected to the processor(s) (202) and may store various information related to operations of the processor(s) (202). For example, the memory(s) (204) may store software code including instructions for performing a part or the entirety of processes controlled by the processor(s) (202) or for performing the descriptions, functions, procedures, proposals, methods, and/or operational flowcharts disclosed in this document. Herein, the processor(s) (202) and the memory(s) (204) may be a part of a communication modem/circuit/chip designed to implement RAT (e.g., LTE or NR). The transceiver(s) (206) may be connected to the processor(s) (202) and transmit and/or receive radio signals through one or more antennas (208). Each of the transceiver(s) (206) may include a transmitter and/or a receiver. The transceiver(s) (206) may be interchangeably used with RF transceiver(s). In the present specification, the wireless device may represent a communication modem/circuit/chip.

Hereinafter, hardware elements of the wireless devices (100, 200) will be described in more detail. One or more protocol layers may be implemented by, without being limited to, one or more processors (102, 202). For example, the one or more processors (102, 202) may implement one or more layers (e.g., functional layers such as PHY, MAC, RLC, PDCP, RRC, and SDAP). The one or more processors (102, 202) may generate one or more Protocol Data Units (PDUs) and/or one or more Service Data Unit (SDUs) according to the descriptions, functions, procedures, proposals, methods, and/or operational flowcharts disclosed in this document. The one or more processors (102, 202) may generate messages, control information, data, or information according to the descriptions, functions, procedures, proposals, methods, and/or operational flowcharts disclosed in this document. The one or more processors (102, 202) may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers (106, 206). The one or more processors (102, 202) may receive the signals (e.g., baseband signals) from the one or more transceivers (106, 206) and obtain the PDUs, SDUs, messages, control information, data, or information according to the descriptions, functions, procedures, proposals, methods, and/or operational flowcharts disclosed in this document.

The one or more processors (102, 202) may be referred to as controllers, microcontrollers, microprocessors, or microcomputers. The one or more processors (102, 202) may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors (102, 202). The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors (102, 202) or stored in the one or more memories (104, 204) so as to be driven by the one or more processors (102, 202). The descriptions, functions, procedures, proposals, methods, and/or operational flowcharts disclosed in this document may be implemented using firmware or software in the form of code, instructions, and/or a set of instructions.

The one or more memories (104, 204) may be connected to the one or more processors (102, 202) and store various types of data, signals, messages, information, programs, code, instructions, and/or commands The one or more memories (104, 204) may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories (104, 204) may be located at the interior and/or exterior of the one or more processors (102, 202). The one or more memories (104, 204) may be connected to the one or more processors (102, 202) through various technologies such as wired or wireless connection.

The one or more transceivers (106, 206) may transmit user data, control information, and/or radio signals/channels, mentioned in the methods and/or operational flowcharts of this document, to one or more other devices. The one or more transceivers (106, 206) may receive user data, control information, and/or radio signals/channels, mentioned in the descriptions, functions, procedures, proposals, methods, and/or operational flowcharts disclosed in this document, from one or more other devices. For example, the one or more transceivers (106, 206) may be connected to the one or more processors (102, 202) and transmit and receive radio signals. For example, the one or more processors (102, 202) may perform control so that the one or more transceivers (106, 206) may transmit user data, control information, or radio signals to one or more other devices. The one or more processors (102, 202) may perform control so that the one or more transceivers (106, 206) may receive user data, control information, or radio signals from one or more other devices. The one or more transceivers (106, 206) may be connected to the one or more antennas (108, 208) and the one or more transceivers (106, 206) may be configured to transmit and receive user data, control information, and/or radio signals/channels, mentioned in the descriptions, functions, procedures, proposals, methods, and/or operational flowcharts disclosed in this document, through the one or more antennas (108, 208). In this document, the one or more antennas may be a plurality of physical antennas or a plurality of logical antennas (e.g., antenna ports). The one or more transceivers (106, 206) may convert received radio signals/channels, and so on, from RF band signals into baseband signals in order to process received user data, control information, radio signals/channels, and so on, using the one or more processors (102, 202). The one or more transceivers (106, 206) may convert the user data, control information, radio signals/channels, and so on, processed using the one or more processors (102, 202) from the base band signals into the RF band signals. For this, the one or more transceivers (106, 206) may include (analog) oscillators and/or filters.

Figure 22:
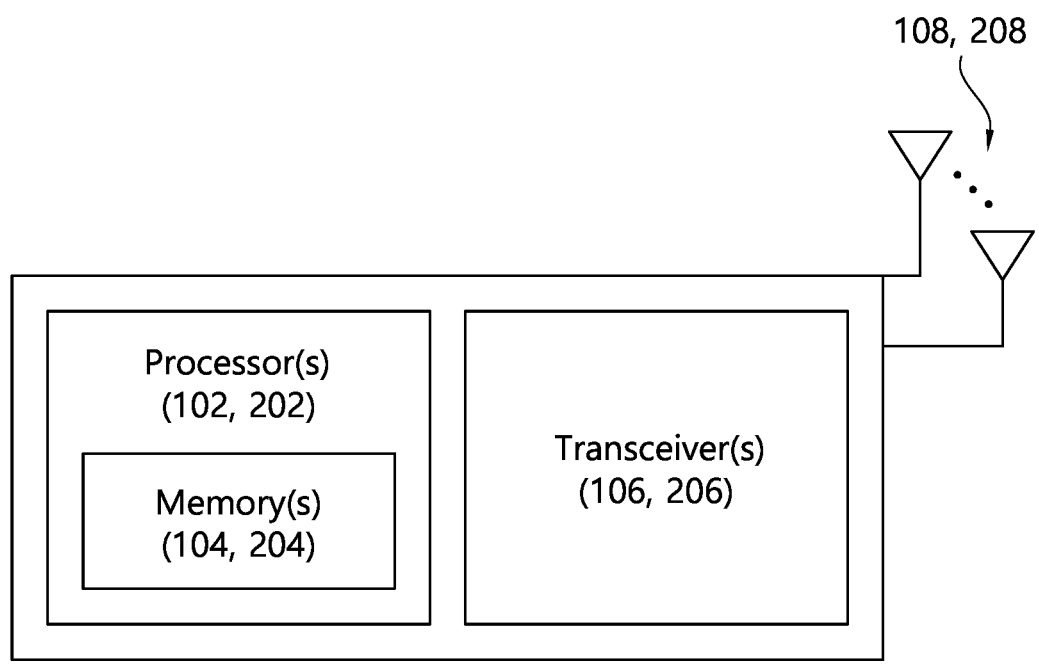
FIG. 22 shows another example of a wireless device applicable to the present specification.

FIG. 22 shows another example of a wireless device applicable to the present specification.

According to FIG. 22, the wireless device may include at least one processor (102, 202), at least one memory (104, 204), at least one transceiver (106, 206), and/or one or more antennas (108, 208).

As a difference between the example of the wireless device described above in FIG. 21 and the example of the wireless device in FIG. 22, in FIG. 21, the processors 102 and 202 and the memories 104 and 204 are separated, but in the example of FIG. 22, the memories 104 and 204 are included in the processors 102 and 202.

Here, a detailed description of the processors 102 and 202, the memories 104 and 204, the transceivers 106 and 206, and the one or more antennas 108 and 208 is as described above, in order to avoid unnecessary repetition of description, description of repeated description will be omitted.

Hereinafter, an example of a signal processing circuit to which the present specification is applied will be described in detail.

Figure 23:
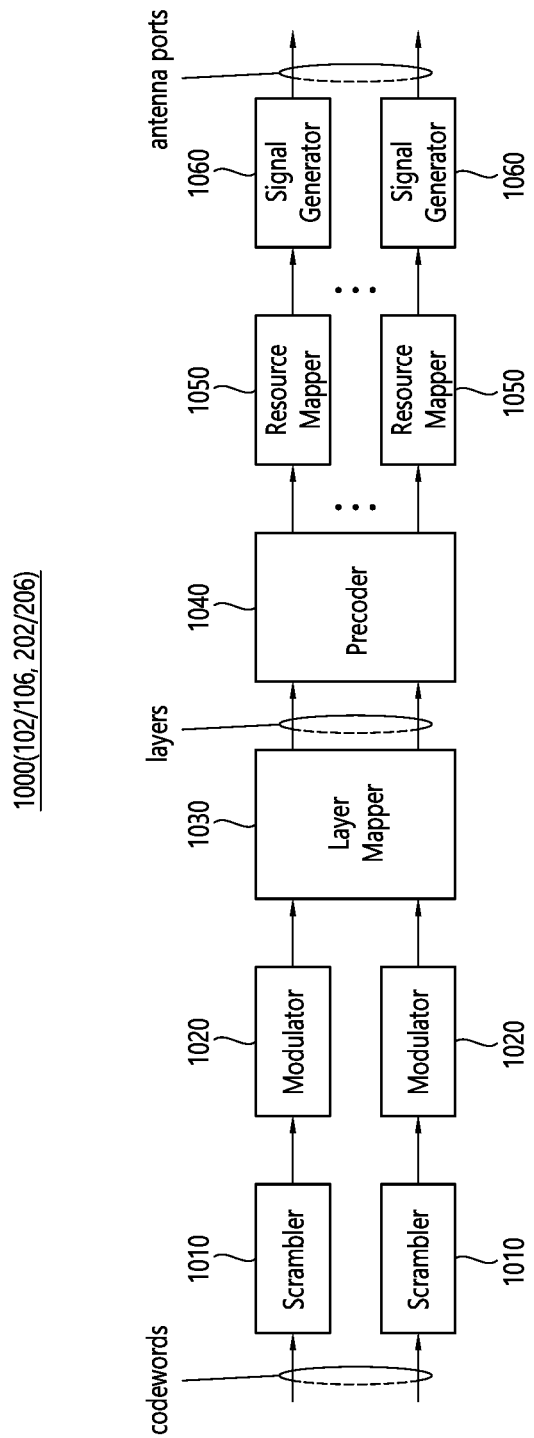
FIG. 23 shows a signal process circuit for a transmission signal according to an embodiment of the present specification.

FIG. 23 shows a signal process circuit for a transmission signal according to an embodiment of the present specification.

Referring to FIG. 23, a signal processing circuit (1000) may include scramblers (1010), modulators (1020), a layer mapper (1030), a precoder (1040), resource mappers (1050), and signal generators (1060). An operation/function of FIG. 23 may be performed, without being limited to, the processors (102, 202) and/or the transceivers (106, 206) of FIG. 21. Hardware elements of FIG. 23 may be implemented by the processors (102, 202) and/or the transceivers (106, 206) of FIG. 21. For example, blocks 1010-1060 may be implemented by the processors (102, 202) of FIG. 21. Alternatively, the blocks 1010-1050 may be implemented by the processors (102, 202) of FIG. 21 and the block 1060 may be implemented by the transceivers (106, 206) of FIG. 21.

Codewords may be converted into radio signals via the signal processing circuit (1000) of FIG. 23. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

More specifically, the codewords may be converted into scrambled bit sequences by the scramblers (1010). Scramble sequences used for scrambling may be generated based on an initialization value, and the initialization value may include ID information of a wireless device. The scrambled bit sequences may be modulated to modulation symbol sequences by the modulators (1020). A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper (1030). Modulation symbols of each transport layer may be mapped (precoded) to corresponding antenna port(s) by the precoder (1040). Outputs z of the precoder (1040) may be obtained by multiplying outputs y of the layer mapper (1030) by an N*M precoding matrix W. Herein, N is the number of antenna ports, and M is the number of transport layers. The precoder (1040) may perform precoding after performing transform precoding (e.g., DFT) for complex modulation symbols. Additionally, the precoder (1040) may perform precoding without performing transform precoding.

The resource mappers (1050) may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators (1060) may generate radio signals from the mapped modulation symbols and the generated radio signals may be transmitted to other devices through each antenna. For this purpose, the signal generators (1060) may include Inverse Fast Fourier Transform (IFFT) modules, Cyclic Prefix (CP) inserters, Digital-to-Analog Converters (DACs), frequency uplink converters, and so on.

Signal processing procedures for a signal received in the wireless device may be configured in a reverse manner of the signal processing procedures (1010~1060) of FIG. 23. For example, the wireless devices (e.g., 100, 200 of FIG. 21) may receive radio signals from the exterior through the antenna ports/transceivers. The received radio signals may be converted into baseband signals through signal restorers. For this, the signal restorers may include frequency downlink converters, Analog-to-Digital Converters (ADCs), CP remover, and Fast Fourier Transform (FFT) modules. Subsequently, the baseband signals may be restored to codewords through a resource demapping procedure, a postcoding procedure, a demodulation processor, and a descrambling procedure. The codewords may be restored to original information blocks through decoding. Therefore, a signal processing circuit (not shown) for a reception signal may include signal restorers, resource demappers, a postcoder, demodulators, descramblers, and decoders.

Hereinafter, a usage example of the wireless to which the present specification is applied will be described in detail.

Figure 24:
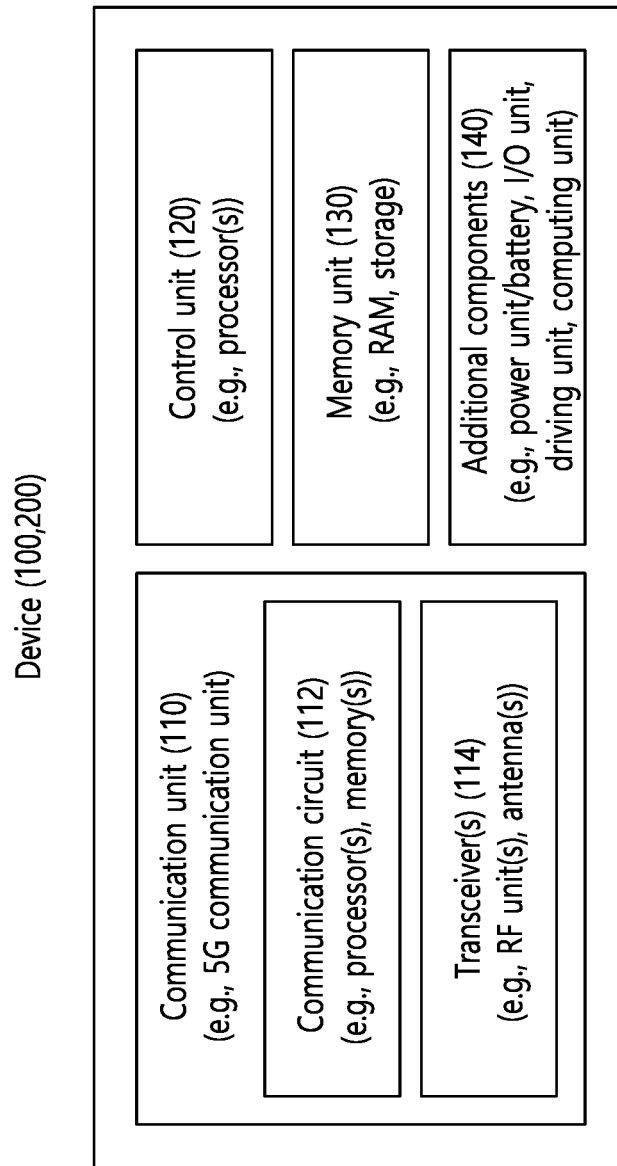
FIG. 24 shows another example of a wireless device according to an embodiment of the present specification.

FIG. 24 shows another example of a wireless device according to an embodiment of the present specification. The wireless device may be implemented in various forms according to a use-case/service (refer to FIG. 20).

Referring to FIG. 24, wireless devices (100, 200) may correspond to the wireless devices (100, 200) of FIG. 21 and may be configured by various elements, components, units/portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 21. For example, the transceiver(s) (114) may include the one or more transceivers (106, 206) and/or the one or more antennas (108, 208) of FIG. 21. The control unit (120) is electrically connected to the communication unit (110), the memory (130), and the additional components (140) and controls overall operation of the wireless devices. For example, the control unit (120) may control an electric/mechanical operation of the wireless device based on programs/code/instructions/information stored in the memory unit (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100a of FIG. 20), the vehicles (100b-1, 100b-2 of FIG. 20), the XR device (100c of FIG. 20), the hand-held device (100d of FIG. 20), the home appliance (100e of FIG. 20), the IoT device (100f of FIG. 20), a digital broadcast terminal, a hologram device, a public safety device, an MTC device, a medicine device, a fintech device (or a finance device), a security device, a climate/environment device, the AI server/device (400 of FIG. 20), the BSs (200 of FIG. 20), a network node, and so on. The wireless device may be used in a mobile or fixed place according to a usage-example/service.

In FIG. 24, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor. As another example, the memory (130) may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 24 will be described in detail with reference to the drawings.

Figure 25:
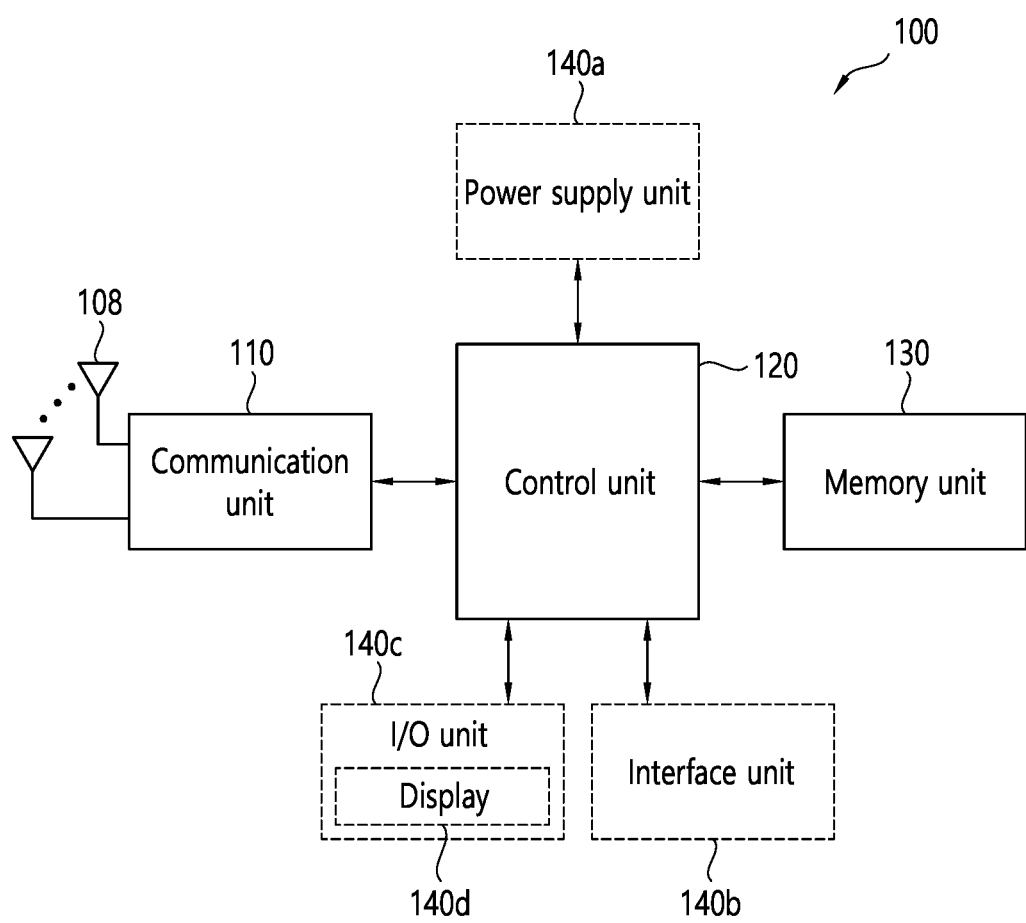
FIG. 25 shows a hand-held device to which the present specification is applied.

FIG. 25 shows a hand-held device to which the present specification is applied. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 25, a hand-held device (100) may include an antenna unit (108), a communication unit (110), a control unit (120), a memory unit (130), a power supply unit (140a), an interface unit (140b), and an I/O unit (140c). The antenna unit (108) may be configured as a part of the communication unit (110). Blocks 110-130/140a-140c correspond to the blocks 110-130/140 of FIG. 24, respectively.

The communication unit (110) may transmit and receive signals (e.g., data and control signals) to and from other wireless devices or BSs. The control unit (120) may perform various operations by controlling constituent elements of the hand-held device (100). The control unit (120) may include an Application Processor (AP). The memory unit (130) may store data/parameters/programs/code/instructions (or commands) needed to drive the hand-held device (100). The memory unit (130) may store input/output data/information. The power supply unit (140a) may supply power to the hand-held device (100) and include a wired/wireless charging circuit, a battery, and so on. The interface unit (140b) may support connection of the hand-held device (100) to other external devices. The interface unit (140b) may include various ports (e.g., an audio I/O port and a video I/O port) for connection with external devices. The I/O unit (140c) may input or output video information/signals, audio information/signals, data, and/or information input by a user. The I/O unit (140c) may include a camera, a microphone, a user input unit, a display unit (140d), a speaker, and/or a haptic module.

As an example, in the case of data communication, the I/O unit (140c) may obtain information/signals (e.g., touch, text, voice, images, or video) input by a user and the obtained information/signals may be stored in the memory unit (130). The communication unit (110) may convert the information/signals stored in the memory into radio signals and transmit the converted radio signals to other wireless devices directly or to a BS. The communication unit (110) may receive radio signals from other wireless devices or the BS and then restore the received radio signals into original information/signals. The restored information/signals may be stored in the memory unit (130) and may be output as various types (e.g., text, voice, images, video, or haptic) through the I/O unit (140c).

Figure 26:
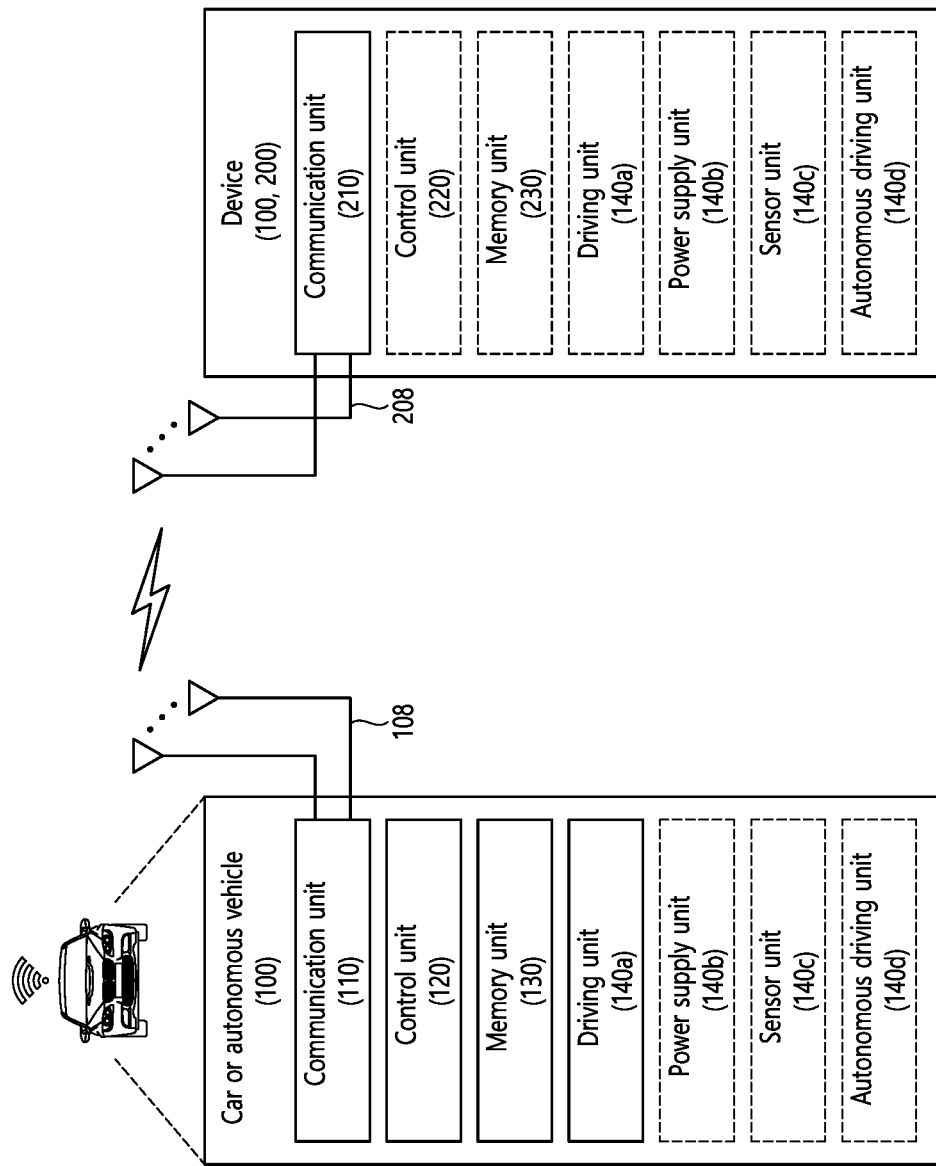
FIG. 26 shows a vehicle or an autonomous vehicle to which the present specification is applied.

FIG. 26 shows a vehicle or an autonomous vehicle to which the present specification is applied. The vehicle or autonomous vehicle may be implemented by a mobile robot, a car, a train, a manned/unmanned Aerial Vehicle (AV), a ship, and so on.

Referring to FIG. 26, a vehicle or autonomous vehicle (100) may include an antenna unit (108), a communication unit (110), a control unit (120), a driving unit (140a), a power supply unit (140b), a sensor unit (140c), and an autonomous driving unit (140d). The antenna unit (108) may be configured as a part of the communication unit (110). The blocks 110/130/140a~140d correspond to the blocks 110/130/140 of FIG. 24, respectively.

The communication unit (110) may transmit and receive signals (e.g., data and control signals) to and from external devices such as other vehicles, BSs (e.g., gNBs and road side units), and servers. The control unit (120) may perform various operations by controlling elements of the vehicle or the autonomous vehicle (100). The control unit (120) may include an Electronic Control Unit (ECU). The driving unit (140a) may cause the vehicle or the autonomous vehicle (100) to drive on a road. The driving unit (140a) may include an engine, a motor, a powertrain, a wheel, a brake, a steering device, and so on. The power supply unit (140b) may supply power to the vehicle or the autonomous vehicle (100) and include a wired/wireless charging circuit, a battery, and so on. The sensor unit (140c) may obtain a vehicle state, ambient environment information, user information, and so on. The sensor unit (140c) may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit (140d) may implement technology for maintaining a lane on which a vehicle is driving, technology for automatically adjusting speed, such as adaptive cruise control, technology for autonomously driving along a determined path, technology for driving by automatically setting a path if a destination is set, and so on.

For example, the communication unit (110) may receive map data, traffic information data, and so on, from an external server. The autonomous driving unit (140d) may generate an autonomous driving path and a driving plan from the obtained data. The control unit (120) may control the driving unit (140a) such that the vehicle or the autonomous vehicle (100) may move along the autonomous driving path according to the driving plan (e.g., speed/direction control). In the middle of autonomous driving, the communication unit (110) may aperiodically/periodically obtain recent traffic information data from the external server and obtain surrounding traffic information data from neighboring vehicles. In the middle of autonomous driving, the sensor unit (140c) may obtain a vehicle state and/or surrounding environment information. The autonomous driving unit (140d) may update the autonomous driving path and the driving plan based on the newly obtained data/information. The communication unit (110) may transfer information on a vehicle position, the autonomous driving path, and/or the driving plan to the external server. The external server may predict traffic information data using AI technology, and so on, based on the information collected from vehicles or autonomous vehicles and provide the predicted traffic information data to the vehicles or the autonomous vehicles.

Claims in the present specification may be combined in various ways. For instance, technical features in method claims of the present specification may be combined to be implemented or performed in an apparatus (or device), and technical features in apparatus claims may be combined to be implemented or performed in a method. Further, technical features in method claim(s) and apparatus claim(s) may be combined to be implemented or performed in an apparatus. Further, technical features in method claim(s) and apparatus claim(s) may be combined to be implemented or performed in a method.

What is claimed is:

1. A method for performing a transmission or a reception of data in a wireless communication system, the method performed by an apparatus and comprising:
    performing an initial access operation with an another apparatus;
    transmitting, to the another apparatus, first information, having a value of X, (M−N) times;
    transmitting, to the another apparatus, second information, having a value of (X+1), N times,
    wherein each of the X, M and the N is a natural number,
    wherein the M is greater than the N,
    wherein each of the first information and the second information is related to adjustment of timing; and
    performing the transmission or the reception of the data with the another apparatus based on a timing advance (TA) value which is determined as (X+N/M).

2. The method of claim 1, wherein each of the first information and the second information is TA command information.

3. The method of claim 2, wherein the TA command information is transmitted through a medium access control (MAC) control element (CE).

4. The method of claim 1, wherein the apparatus is a node, the another apparatus is a child node, and the transmission or the reception of the data is performed based on an integrated access and backhaul (IAB) operation.

5. The method of claim 4, wherein the IAB operation comprises a mobile terminal (MT) operation or a distributed unit (DU) operation.

6. The method of claim 5,
    wherein the MT operation is an operation related to communication between the node and a parent node, and
    wherein the DU operation is an operation related to communication between the node and the child node or communication between the node and a terminal.

7. The method of claim 6, wherein each of the node, the parent node and the child node is an IAB node.

8. An apparatus comprising:
a transceiver;
at least one memory; and
at least one processor operatively coupled with the at least one memory and the transceiver, the at least one processor configured to:
perform an initial access operation with an another apparatus;
control the transceiver to transmit, to the another apparatus, first information, having a value of X, (M−N) times,
control the transceiver to transmit, to the another apparatus, second information, having a value of (X+1), N times,
wherein each of the X, M and the N is a natural number,
wherein the M is greater than the N,
wherein each of the first information and the second information is related to adjustment of timing; and
performing a transmission or a reception of a data with the another apparatus based on a timing advance (TA) value which is determined as (X+N/M).

9. A method for performing a transmission or a reception of data in a wireless communication system, the method performed by an apparatus and comprising:
performing an initial access operation with an another apparatus;
receiving, from the another apparatus, first information (M−N), having a value of X, times,
receiving, from the another apparatus, second information, having a value of (X+1), N times,
wherein each of the X, M and the N is a nature natural number,
wherein the M is greater than the N,
wherein each of the first information and the second information is related to adjustment of timing; and
performing the transmission or the reception of the data with the another apparatus based on a timing advance (TA) value which is determined as (X+N/M).

* * * * *